United States Patent [19]

Youla et al.

[11] Patent Number: 5,313,026
[45] Date of Patent: May 17, 1994

[54] ELECTRONIC STEPPER TO DETERMINE ELEVATOR CAR POSITION, WITH AUTOMATIC ERROR CORRECTION AND IMMUNITY FROM POWER FAILURE

[75] Inventors: Jean Youla, Brooklyn, N.Y.; Monique M. LaRose, Berlin, Mass.; William P. Reid, Windsor; Burton Greenfield, Avon, both of Conn.

[73] Assignee: Otis Elevator Company, Farmington, Conn.

[21] Appl. No.: 728,669

[22] Filed: Jul. 11, 1991

[51] Int. Cl.⁵ .............................................. B66B 3/02
[52] U.S. Cl. .................................. 187/134; 187/117; 187/136
[58] Field of Search ............... 187/136, 134, 113, 130, 187/102, 117

[56] References Cited

U.S. PATENT DOCUMENTS

| | | | |
|---|---|---|---|
| 4,545,406 | 10/1985 | King | 137/553 |
| 4,630,026 | 12/1986 | Lewis | 340/21 |
| 4,658,935 | 4/1987 | Holland | . |
| 4,754,851 | 7/1988 | Suzuki | 187/129 |
| 5,004,076 | 4/1991 | Chen et al. | 187/130 |
| 5,085,294 | 2/1992 | Iwata | 187/134 |
| 5,153,390 | 10/1992 | Barkman et al. | 187/134 |
| 5,175,400 | 12/1992 | Hirabayashi et al. | 187/103 |

FOREIGN PATENT DOCUMENTS

| | | | |
|---|---|---|---|
| 3-46982 | 2/1991 | Japan | 187/134 |
| 2060205 | 4/1981 | United Kingdom | 187/134 |

OTHER PUBLICATIONS

Universal Electronic Stepping Switch, Sales literature published by P.C.-X-Change Inc. describing one to eight bank top and bottom correction device for replacing mechanical stepper.

Primary Examiner—Steven L. Stephan
Assistant Examiner—Robert Nappi
Attorney, Agent, or Firm—Francis J. Maguire, Jr.

[57] ABSTRACT

An electronic stepper for indicating floor position has initialization switches set by a serviceman for indicating a reference floor position. Whenever the car goes by the reference position in the hoistway, the corresponding reference floor is output. The electronic stepper may be mounted on a printed circuit board having a floor display for use by the serviceman. Various toggle switches may be provided for use by the serviceman in setting up and checking operation. Power checking means may be provided for initiating nonvolatile storage of the current floor position in the event of a brown-out or other power failure. Watchdog circuitry may be provided for checking on the health of the signal processor and a circuit for watching the watchdog may also be provided. A timed window signal may also be provided for indicating the end of the time at which a stopping sequence must be initiated in order to be able to stop at the approaching floor.

4 Claims, 19 Drawing Sheets

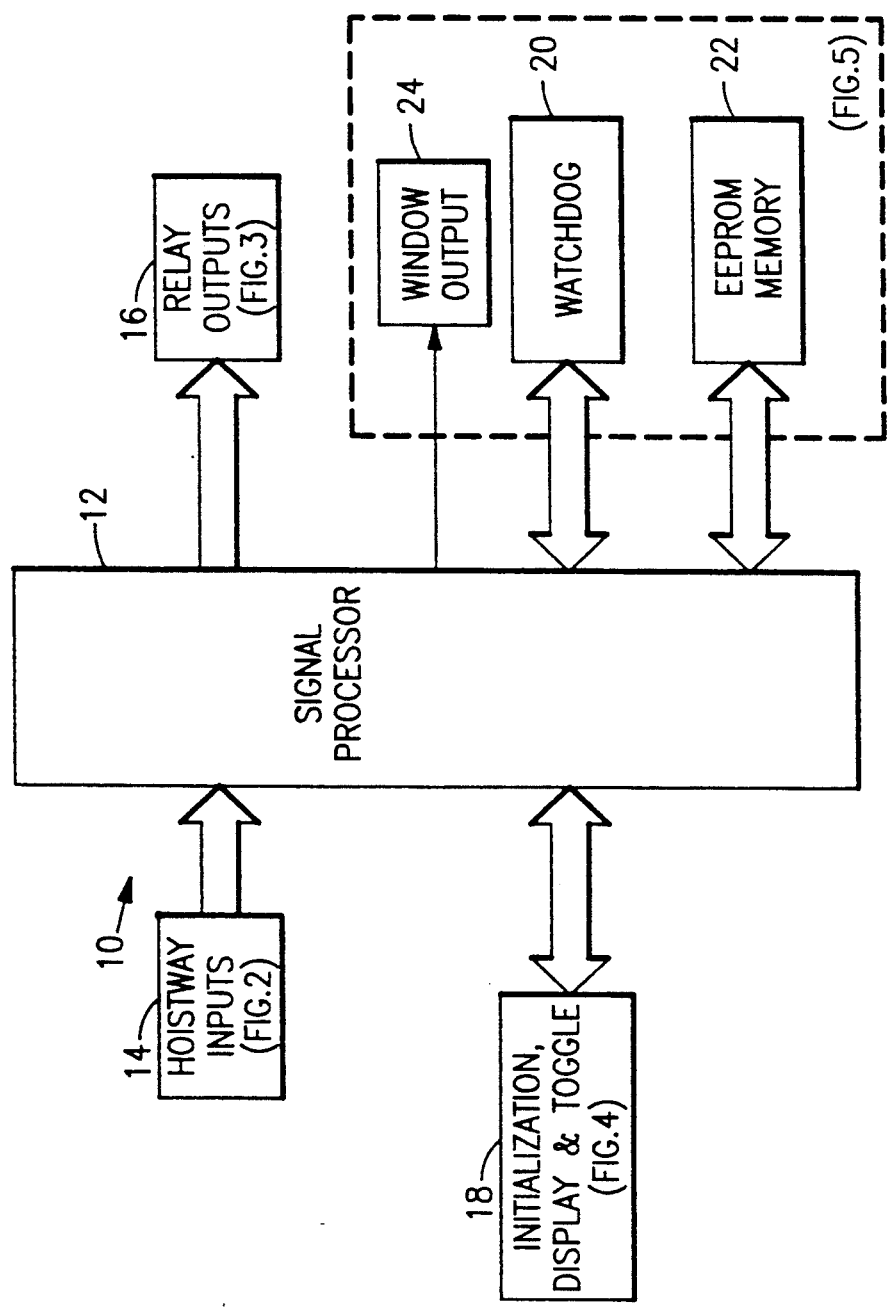

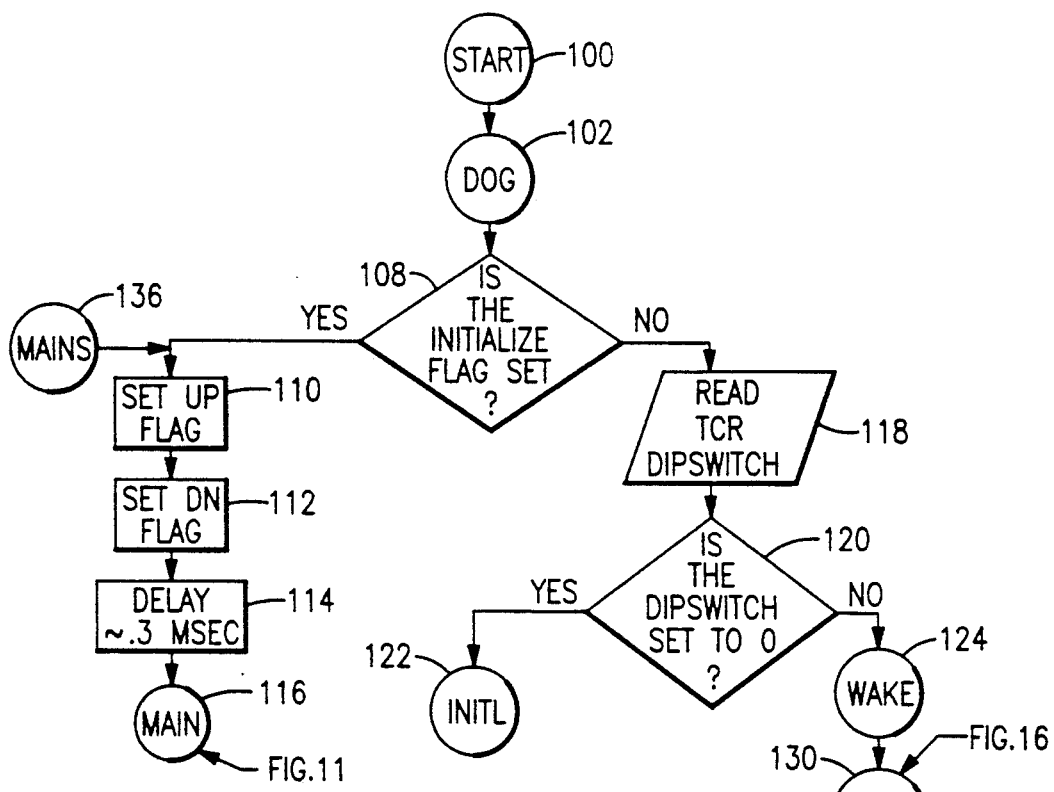
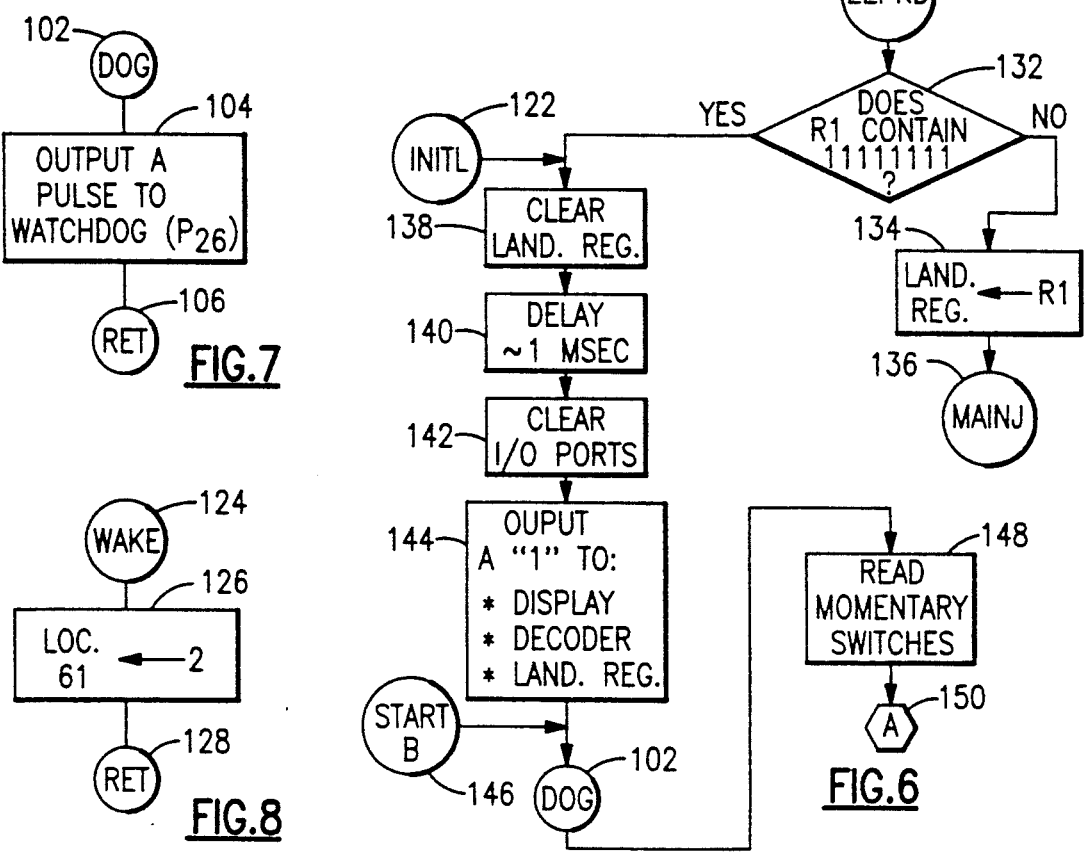

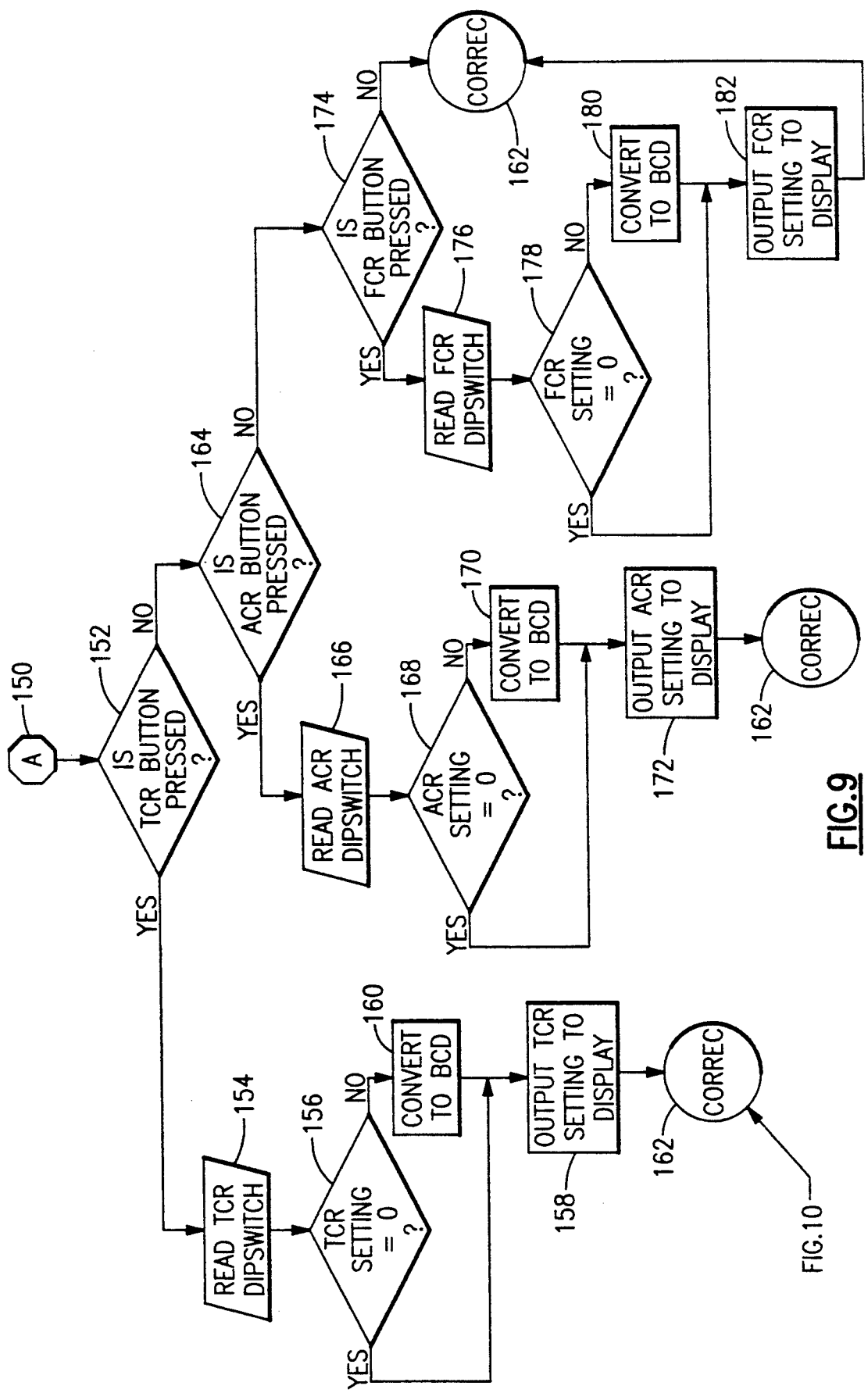

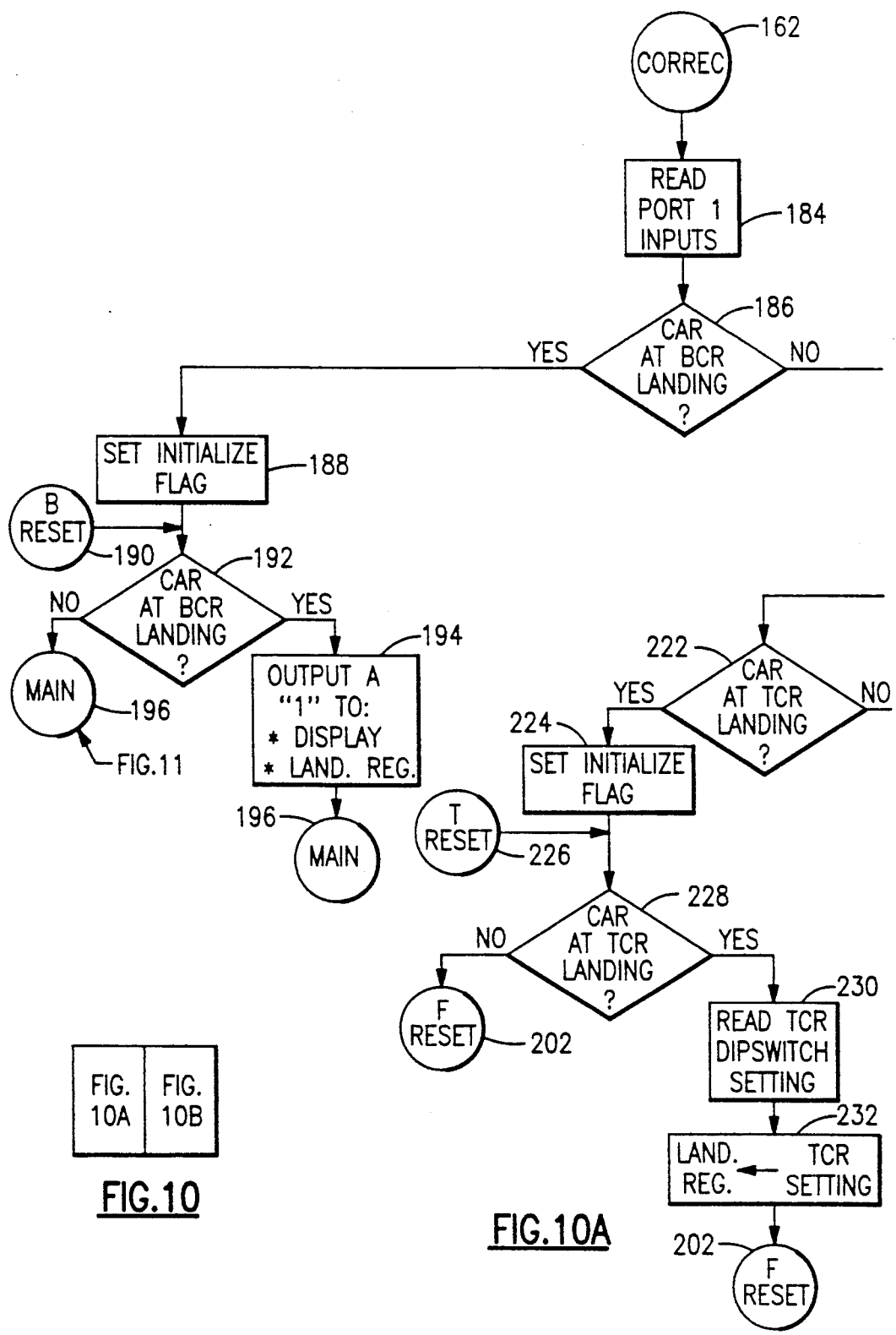

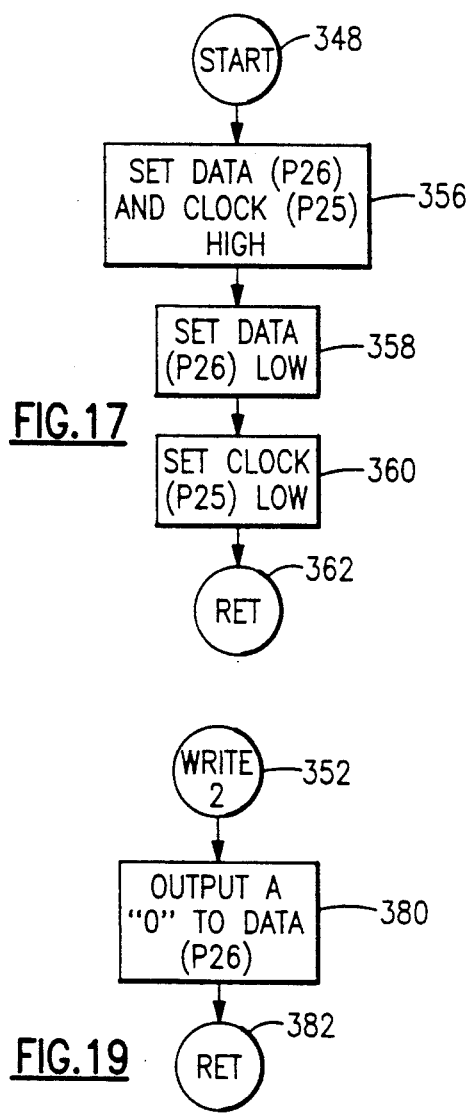
FIG.17
FIG.19
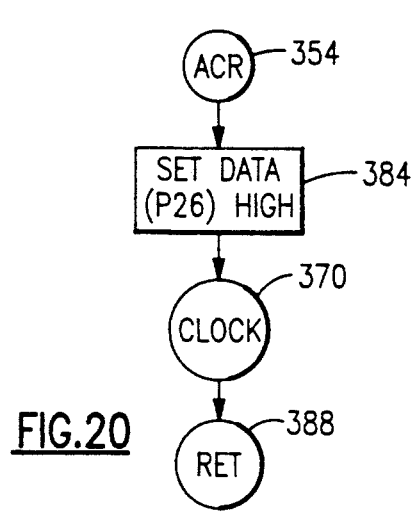
FIG.20
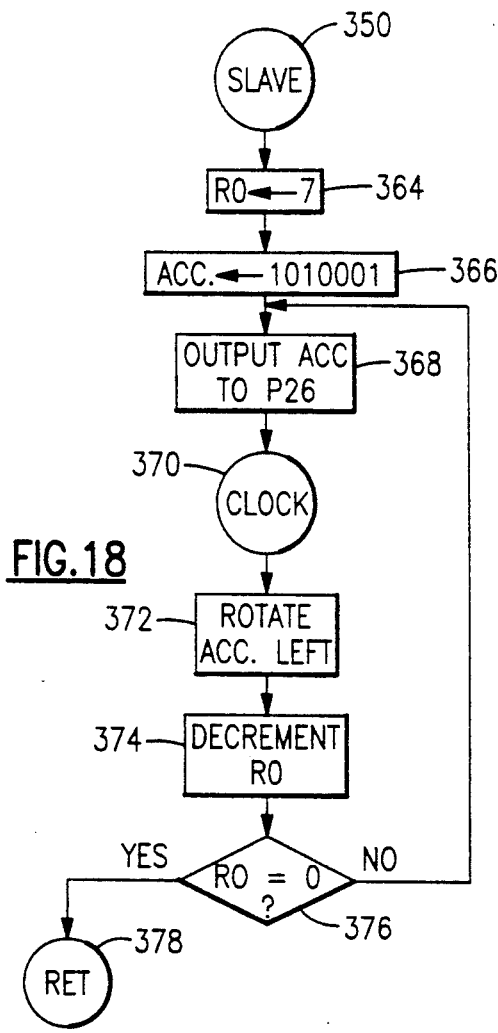
FIG.18
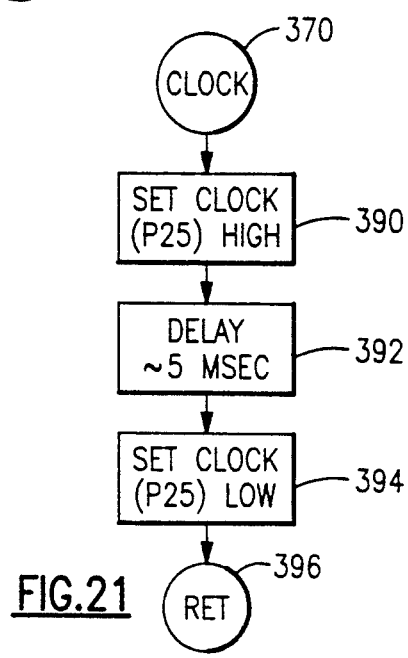
FIG.21

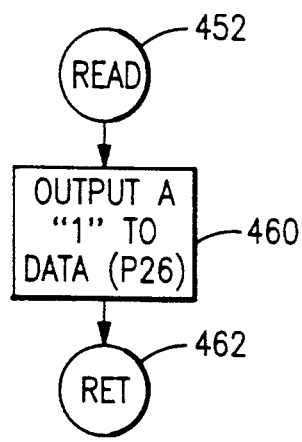
FIG.26
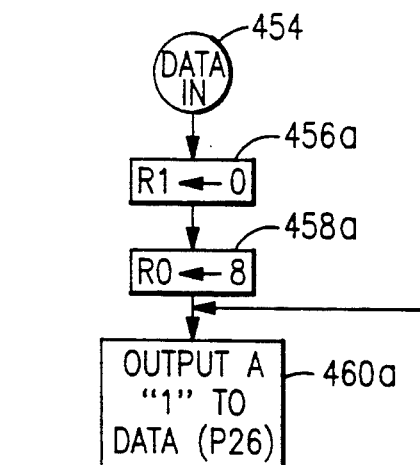
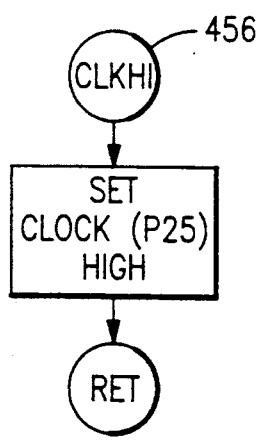
FIG.27
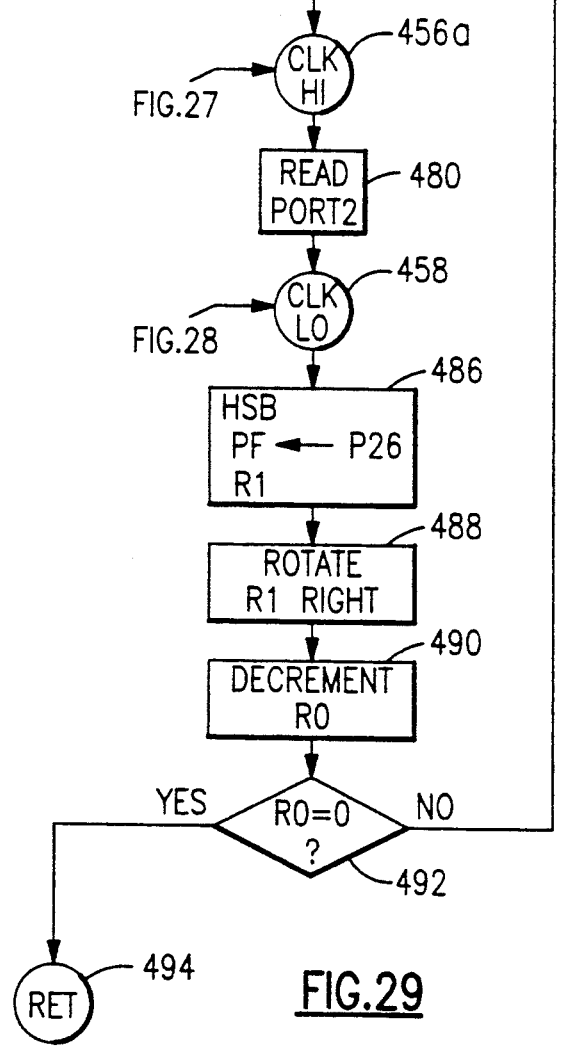
FIG.29
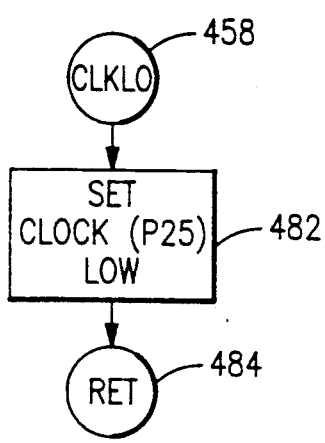
FIG.28

ELECTRONIC STEPPER TO DETERMINE ELEVATOR CAR POSITION, WITH AUTOMATIC ERROR CORRECTION AND IMMUNITY FROM POWER FAILURE

TECHNICAL FIELD

This invention relates to elevator systems and, more particularly, to means and methods for processing information relating to sensed floor positions.

BACKGROUND OF THE INVENTION

Various means and methods for keeping track of and utilizing information relating to elevator floor position have been employed in the elevator art. For example, electromechanical "stepping selectors" for elevators have been used, which in response to a pulse from a proximity switch on top of the elevator car which senses a hoistway vane, the stepper relay advances one position in the appropriate direction as determined by the current actual direction of car motion. This system is inexpensive, but can sometimes have reliability problems. The stepper relay is a ratchet device and may at times make two steps instead of one. Also, there is a high failure rate. Electronic counter circuits have been used to avoid the electromechanical approach for driving position relays. The circuits use MSI logic and are relatively simple in concept and design.

DISCLOSURE OF INVENTION

According to the present invention, an electronic stepper comprises a signal processor responsive to hoistway inputs and inputs from initialization switches for initializing and for providing relay outputs for providing floor information to an elevator controller.

In further accord with the present invention, a display may be provided, responsive to outputs from the signal processor, for displaying the floor position. Additionally, one or more switches may be provided for toggling the floor position display up or down during normal operation which will be sensed by the signal processor and used to correct floor position. Furthermore, the switches may be used for displaying selected floor information during initialization. Thus, DIP switches on the main board allow for selection of the top landing (the highest position to be counted to), and up to two other landings for absolute correction from external signals. On-board, dual 7-segment displays which show the current landing position to assist in setting up the board or for troubleshooting purposes. On-board up and down increment buttons and a discrete bottom landing reset button for set up, maintenance or troubleshooting purposes.

In still further accord with the present invention, a watchdog circuit may be provided to check the "health" of the signal processor. Moreover, a circuit can be provided to watch the watchdog.

In still further accord with the present invention, a voltage monitor can be provided to provide a low voltage signal to the signal processor in order to store the current floor position in a nonvolatile memory during a power failure. Upon detecting restoration of power after loss thereof, the contents of the nonvolatile memory can be read by the signal processor in order to commence operation at the same landing where power was lost. We teach that the storage can be done serially to save the need for extra hardware connections which might otherwise be used for parallel communication.

In accord with the present invention, EEPROM memory allows restoration of position on powering up after a power failure by:

(a) Enhanced reliability by use of a special EEPROM with 3.5 volt operating capability and a five-volt supply with extended output voltage decay time on power failure allows software extra time for nuisance discrimination and, if needed for the data transfer to take place; and (b) Special software routines for noise discrimination and to limit to two the number of times a write command to the EEPROM can occur for any one low voltage or voltage loss condition.

In still further accord with the present invention, a window output is provided by the signal processor for the purpose of indicating a point at which a slowdown operation can commence in order to be able to stop at the next floor. In other words, when an UP or DN pulse is received, we must be sure the stepper has a chance to update the prior landing information before outputting the landing information. Otherwise, the car may stop one floor off from where it should. One relay on a main board may be used for the "window" function providing independent outputs for external logic circuits to insure that a position increment or decrement has occurred before "reading" such position.

We also teach a microprocessor controlled, bi-directional electronic stepping device with discrete slave relay contact outputs for use in an elevator system with up to a selected number of landings, e.g., 31 landings.

In one embodiment, each output relay has two normally open contacts. One feeds position information to logic circuits and the other is used to directly operate corridor lantern devices.

In still further accord with the present invention, all input signals are optically isolated to provide common mode immunity and have special noise and transient voltage suppression circuits, including the ability to reject spurious, short pulse input signals. Software is designed not to recognize very short multiple pulses as would occur due to relay contact bounce at an input. This prevents improper counting.

In still further accord with the present invention, various LEDs indicate the status of input signals, normal "running" of the microprocessor, and status of special watchdog circuitry which monitors the processor.

In still further accord with the present invention, on power up, the processor may come up in an incorrect state. The watchdog circuit checks an output and will deliver a reset pulse if necessary. In addition, during a brown-out, a memory store of floor information is carried out, and the watchdog is prevented from delivering a reset during that operation.

In still further accord with the present invention, during fast duration power outages or brown-outs, the watchdog itself may get locked up and not be capable of resetting the processor. An auxiliary circuit "watches the watchdog" and will provide the reset pulse if necessary. As processor pulses start coming out normally, the watchdog normalizes.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 is a block diagram illustration of an electronic stepper, according to the present invention;

FIGS. 6-9, 10A, 10B and 11-29 are flow chart illustrations of a program which may be carried out on the signal processor according to the present invention.

BEST MODE FOR CARRYING OUT THE INVENTION

Figures 2, 2A:
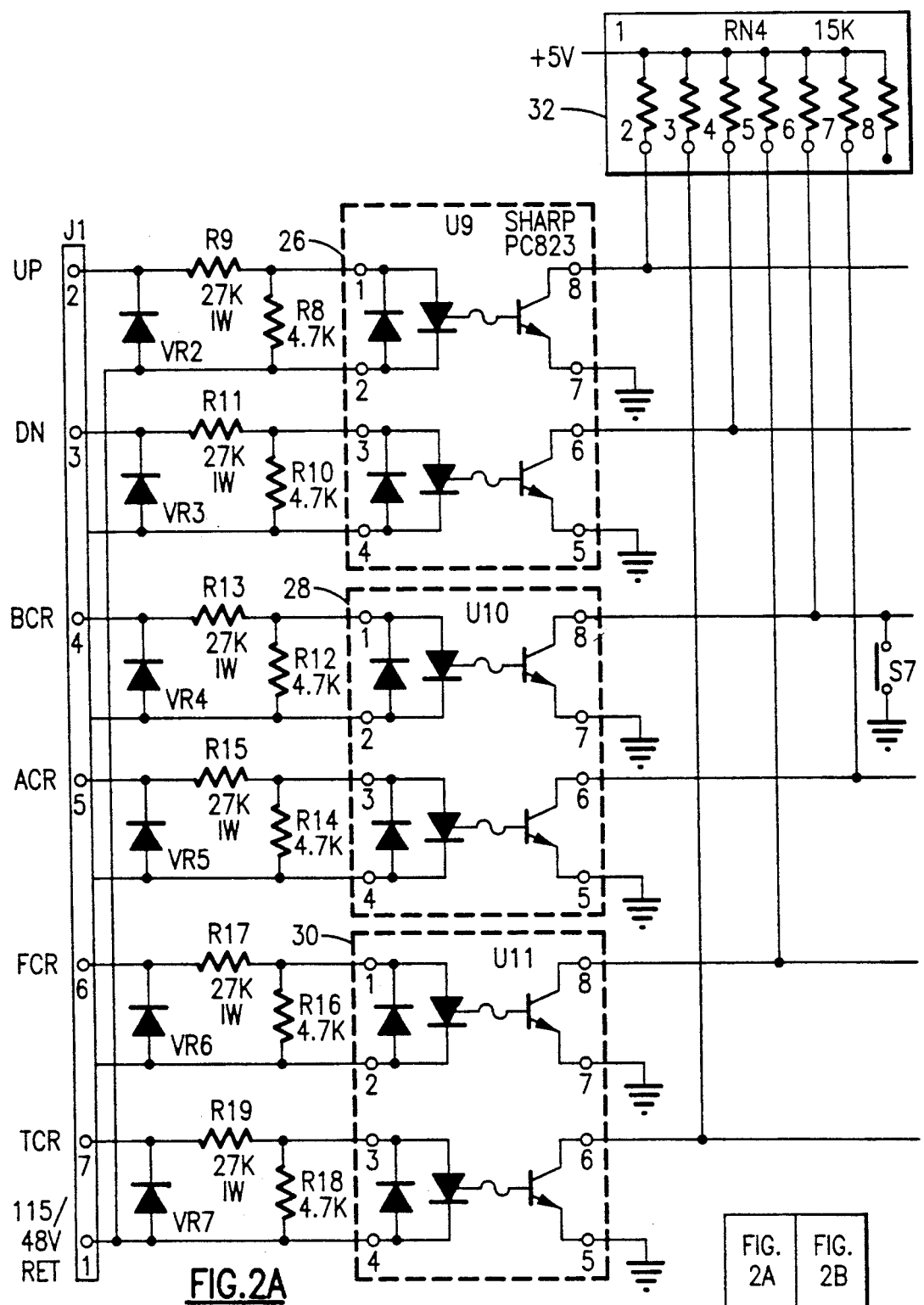
FIGS. 2A and 2B are an illustration of an embodiment of hoistway inputs of FIG. 1.
Figure 2B:
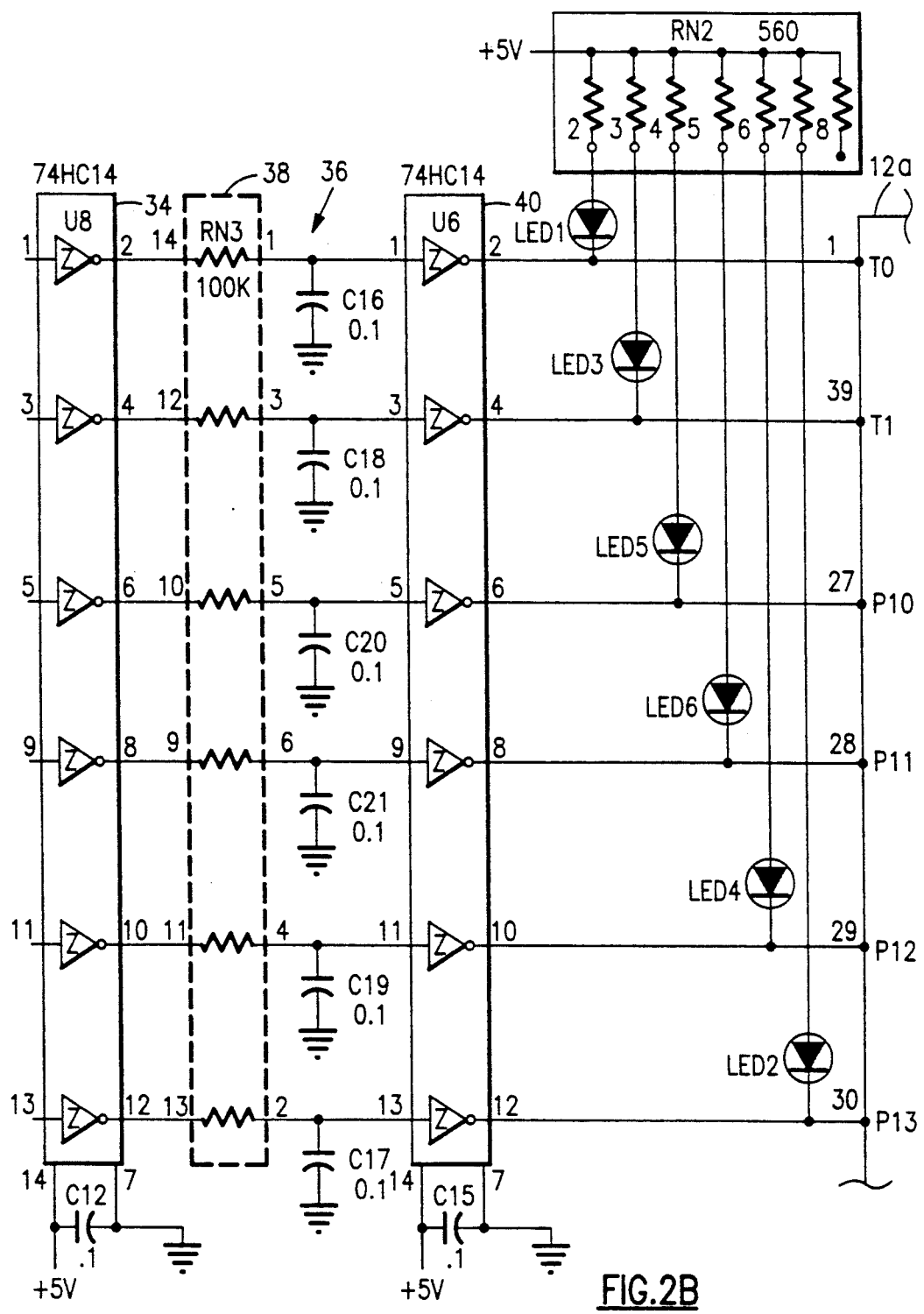

FIG. 1 shows an electronic stepper 10 comprising a signal processor 12 responsive to a plurality of hoistway inputs 14. The hoistway inputs correspond to various discrete input signals from the hoistway which are sensed when the car passes various points therein. For example, when a proximity switch on top of the car senses a hoistway vane indicating an approaching floor, a pulse is generated which is provided to the signal processor which causes one of a plurality of relay outputs 16 to be activated for use by an elevator controller in keeping track of at which floor the car is presently located. The controller landing relay (not shown) is driven by the output circuit of one of two form A contacts, the other for a hall lantern circuit, if furnished.

The components shown in FIG. 1 will typically be mounted on a printed circuit board. FIGS. 2, 3, 4, and 5 may be fitted together to show a schematic of a total circuit with FIG. 2 in the upper left, FIG. 3 in the upper right, FIG. 4 in the lower left, and FIG. 5 in the lower right. The embodiments shown can accommodate up to a selected number of landings, but expander boards (not shown) can be used to extend to a larger number of floors.

An initialization, display, and toggle circuit 18 is used for initialization of the signal processor 12 by means of a plurality of switches. The same switches can be used during normal operation for other purposes, as shown below, in conjunction with a display which also may be used during normal operation and initialization.

A watchdog circuit 20 may check the health of the signal processor 12 by waiting for periodic pulses therefrom. The absence thereof determines that there is something wrong and takes appropriate action. A voltage sensing circuit may be provided for early detection of a voltage fall-off in order to cause the signal processor, which has a volatile memory for keeping track of the floor position, to immediately store the current floor position in a nonvolatile memory 22 before the voltage can fall below the value at which the signal processor's internal memory will become in danger of losing that information. After restoration of the voltage, the signal processor reads the previously nonvolatilely stored floor information and continues, as before, without having lost the current floor position information. A window output circuit 24 may be provided to indicate from the signal processor when the car is at a point at which slowdown must commence or else be unable to stop at the next floor.

Referring now to FIG. 2, which shows details of a hoistway input circuit 14, there are six inputs which terminate on a connector J1 and are labeled: UP, DN, BCR, ACR, FCR, and TCR. The UP and DN signals come from controller relays which are driven by proximity switches on top of the car. The proximity switches sense hoistway vanes which are positioned to be sensed in order to indicate the car's position in the hoistway. A medium speed car, for example, may travel at 107 meters per minute which may, for example, create a pulse on a 2.1 meter vane for about 1.2 seconds. A longer vane would be used for higher speed cars to get a pulse of comparable duration. BCR and TCR come from separate hoistway limit switches for top and bottom comparison and correction, if necessary. FCR is an input from a top-of-car sensor which is activated only at the designated firemen's service landing. ACR is similar, being activated only at the alternate firemen's service landing. The BCR (Bottom landing Correction Reference), ACR (Alternate Correction Reference), FCR (Firemen's landing Correction Reference) and TCR (Top landing Correction Reference) signals serve as synchronizing or correction signals for indicating the time at which a comparison or substitution of the current floor count with or for a count corresponding to a selected floor should be made for initializations, checking, or correcting purposes. We use substitution, i.e., correction in all events. But comparison and substitution for errors only would be equivalent. For the devices shown, the input voltages can be as low as 48 volts DC and as high as 120 volts AC. The input voltages energize three dual bi-polar opto-isolators 26, 28, 30, which may be SHARP PC823 dual opto-couplers. The outputs of these are pulled up by an resistor network 32 and fed into a hex Schmitt trigger inverter 34, which may be 74HC14 hex inverters made by Motorola or National Semiconductor used to reduce jitter. The output of the various Schmitt triggers is filtered time-on delay by RC networks 36 made up of resistor network 38 and capacitors C16-C21. This is followed by another hex inverter 40 which connects to a microcontroller 12a which may be a microcontroller 8748HC made by NEC or INTEL at inputs as shown. This hardware debouncing makes sure the input is true before providing same to the processor 12a.

Note that the main inputs UP and DN connect to a pair of testable inputs T0 and T1, while the other four inputs use four pins of port No. 1. LED's 1, 3, 5, 6, 4, 2 indicate to a serviceman when an input is present on any of the six pins.

Figure 3:
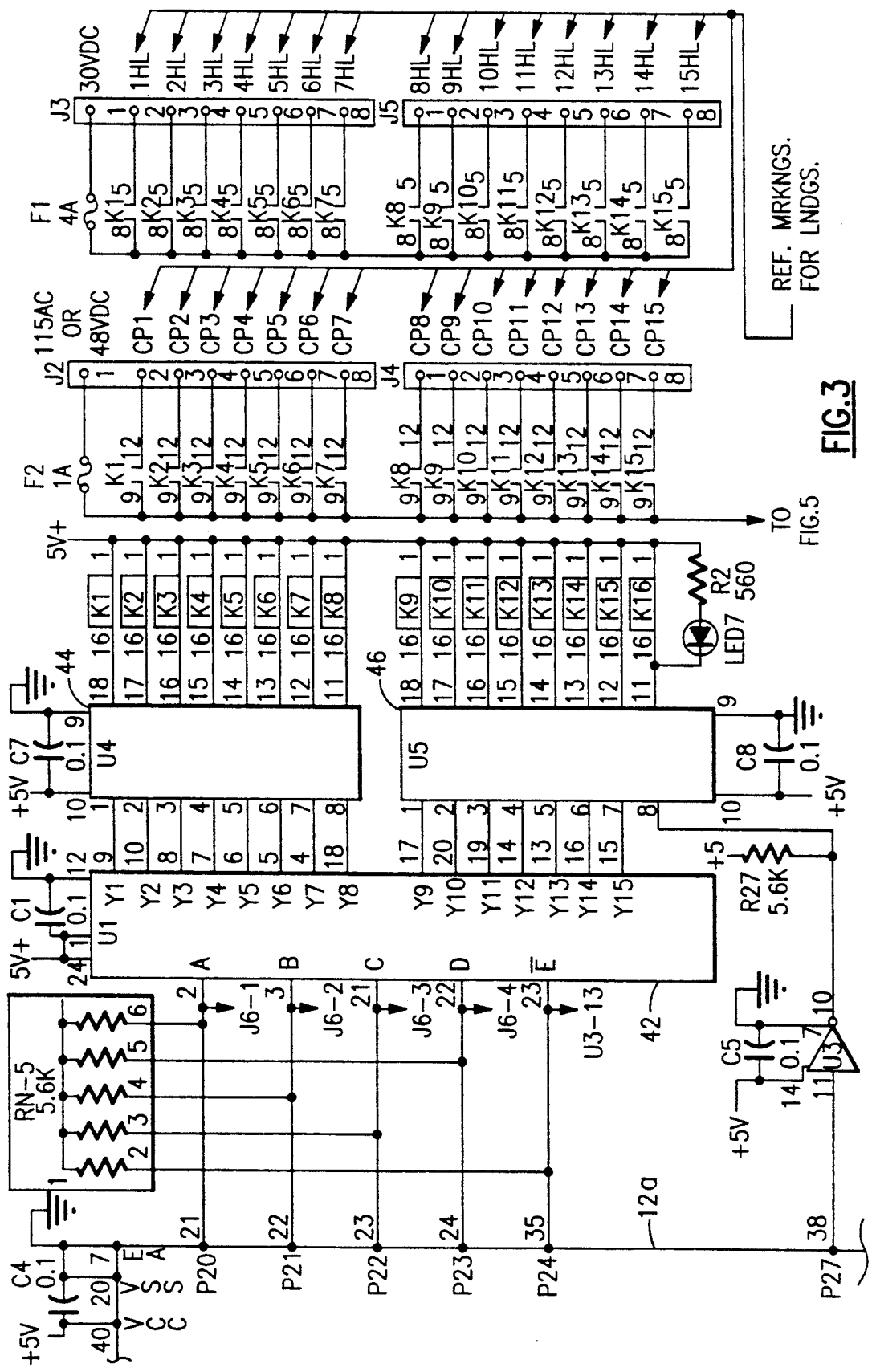
FIG. 3 is an embodiment of relay outputs of FIG. 1.

Referring now to FIG. 3, the first five bits of port No. 2 are used for the output. Four of these bits, P20, P21, P22, P23 are decoded by a decoder 42 which may be a "one of sixteen" decoder made by Texas Instruments or Motorola under Part No. 74HC4514NT. Decoder 42 selects one of fifteen relay drivers in transistor arrays 44, 46, which may be Sprague or SGS ULN2805A transistor arrays. The transistor arrays drive a plurality of relays (K1-K16), which may be made by AROMAT under part number DSP2AE5V. Note that the Y0 output of decoder 42 is not used here, since the sixteenth relay labeled K16 is driven independently by P27 of the microcontroller 12a, the eighth bit of port 2. This relay (K16) known as the "window" relay, is energized about 10 milliseconds after a vane is sensed at T0 or T1 on the microcontroller 12a and drops back out when timed out by software, as desired. LED 7 indicates when the relay is energized. The term "window" refers to a time interval during which a stopping sequence can be initiated. After an up or down input signal is received, the software will not "see" input perturbations due to hoistway vane imperfections. A suitable "off" period must be established between successive "reads".

Figure 4:
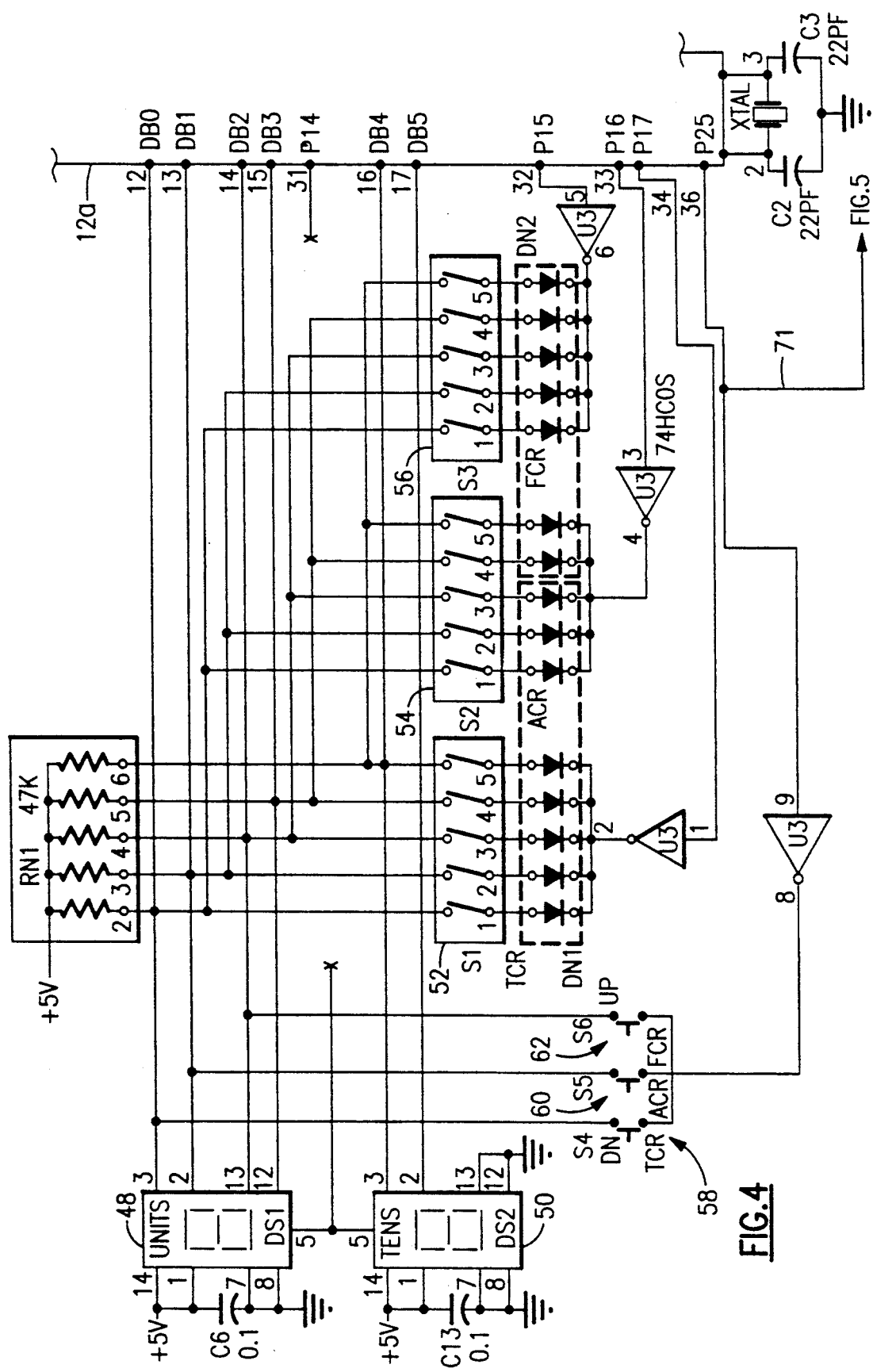
FIG. 4 is an embodiment of initialization, display and toggle circuitry of FIG. 1.

Referring now to FIG. 4, the bi-directional data bus of the microcontroller 12a is used to output BCD floor landing data to seven segment displays 48, 50, which may be TIL-311 displays made by TI. The dual display can change only when pins 5 are brought low by the P14 bit from microcontroller 12a.

The software, to be disclosed in more detail below, has an initialization routine which runs only at start-up and is bypassed in normal operation. During initialization, the data bus can receive inputs from three five-position DIP switches 52, 54, 56, which may be made by AMP under P/N 3-435640-6 or by EECO under P/N 240005GP and which are used to set, into memory registers, the number of the top landing (TCR, the total number of stops), the number of the alternate firemen's landing (ACR), and the number of the designated firemen's landing (FCR). Also during initialization, and only during initialization, switches 58, 60, 62, when pushed, will cause the settings TCR, ACR, and FCR to be displayed, respectively, on the display 48, 50 for a local visual check. During normal operation, after initialization, switches 58, 62 can be used to step the count down or up, respectively.

Figure 5:
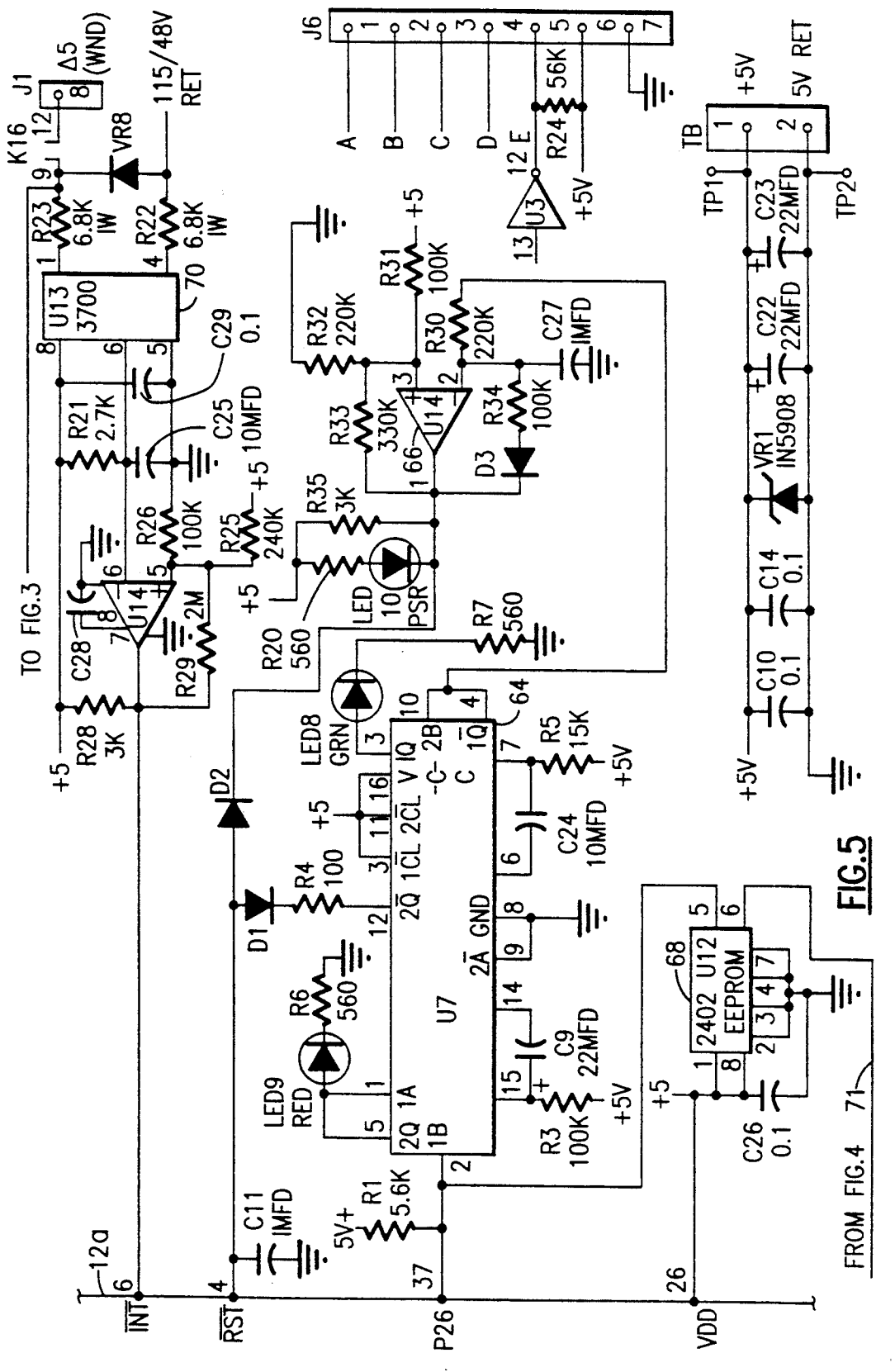
FIG. 5 is an embodiment showing a window output, watchdog circuitry and memory of FIG. 1.

Referring now to FIG. 5, the watchdog circuit is made up of a dual retriggerable multi-vibrator 64 which may be made by Toshiba under Part No. 74HC123. Indicators LED8 (green) and LED9 (red), respectively, indicate normal operation and reset operation. If the watchdog is required to reset the processor, the red LED 9 comes on momentarily. On power up, it is possible for the processor to initially have an incorrect state with the watchdog not ready by resetting. An auxiliary circuit using comparator 66 as a pulse generator "watches the watchdog" and will provide a reset pulse if the 5 V supply goes down, i.e., it also "watches" the 5 V supply for being an alternate cause of reset through a diode D2.

The microcontroller has 1K of nonvolatile ROM internally for storing the program described in FIGS. 6–29. Since the microcontroller (or processor) memory registers in this embodiment comprise volatile NOVRAM, a nonvolatile memory unit 68, which may be a 24LC04PI EEPROM made by XICOR, is provided for the purpose of remembering the position of the car during a power outage.

A voltage monitor 70, which may be an integrated circuit made by Hewlett Packard or ISOCOM under Part Nos. HCPL3700 and 3700, respectively, causes an interrupt when line voltage is going down. Bit P26 (see FIG. 5) enables the EEPROM 68 on a signal line 71 so that P26 can write the position number serially to the EEPROM 68. Output P26 provides clock signals instead of "health" pulses during a brown-out. Timing is such that this sequence is accomplished before the five volt supply has dropped too far. When power is restored, the microcontroller 12a gets a "power-on-reset" which causes P26 to now read the number serially from the EEPROM 68. The POR will cause initialization upon return of power and may be considered a request for initialization. One or more extender boards may be daisy-chained by hooking up additional decoders through a jack J5 as shown.

Referring now to FIG. 6, a start is made in a step 100, after which a DOG subroutine 102 is executed as shown in FIG. 7. That subroutine is called frequently and involves outputting a "health" pulse to the watchdog circuit 20 of FIG. 5, as indicated in a step 104 to indicate to the watchdog circuit that the processor is not "hung-up". A return is made in a step 106 and a decision step 108 is next executed in which the system differentiates between a reset and a power up by checking an initialize flag at a selected memory location, e.g., location 62. If the selected location contains a selected hexadecimal number, e.g., 5A, a reset occurred. If it does not, a power up occurred. Thus, if the selected number is in the selected location, an UP flag is set in a step 110 and a DN flag is set in a step 112. The reason for setting these flags is because they will be cleared during a reset. Therefore, if a reset occurred while on an up or down vane, the stepper might double count. After a delay, as indicated in a step 114, e.g., 0.3 milliseconds, to charge the capacitors, a transfer to a subroutine MAIN in FIG. 11, as indicated by a step 116, is made.

If the selected hex number is not in the selected location, a step 118 reads the TCR DIP switch 58 of FIG. 4. If it is set to all zeros, as determined in a decision step 120, a transfer to an INITL subroutine is made, as indicated in a step 122. This subroutine also appears in this FIG. 6.

If the TCR DIP switch 58 is not set to zeros, a WAKE subroutine appearing in FIG. 8, as indicated by a step 124, is executed. The WAKE subroutine puts another selected number, e.g., 2, into another selected memory location, e.g. 61. This location is used as a counter for an interrupt routine shown in FIG. 15. If the interrupt line remains low for a long period of time, the counter ensures that the EEPROM 68 of FIG. 5 (same as 22 of FIG. 1) is not written to more than twice. The writing step is indicated in a step 126 after which a return is made, as indicated in a step 128.

Figure 15:
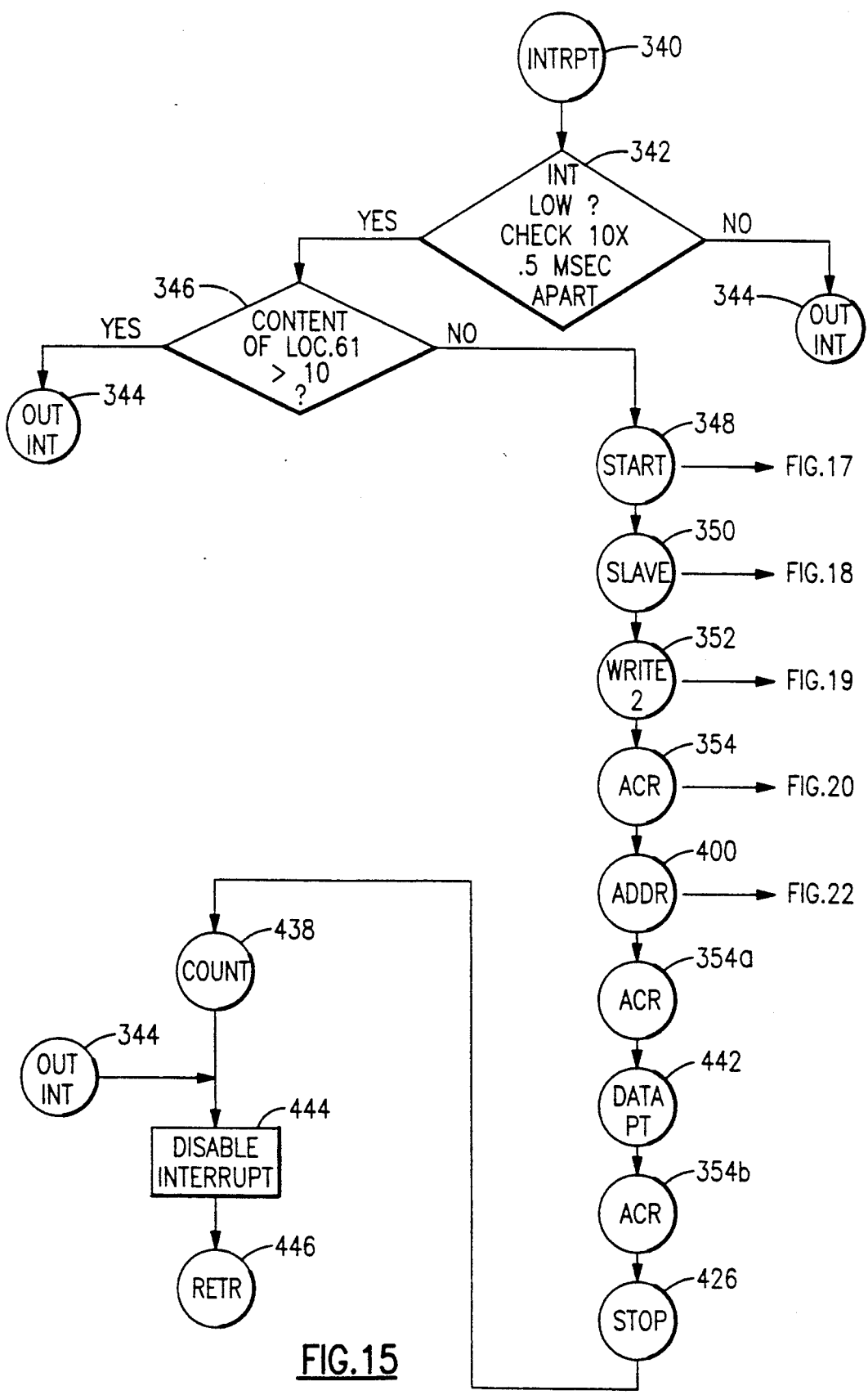
Figure 16:
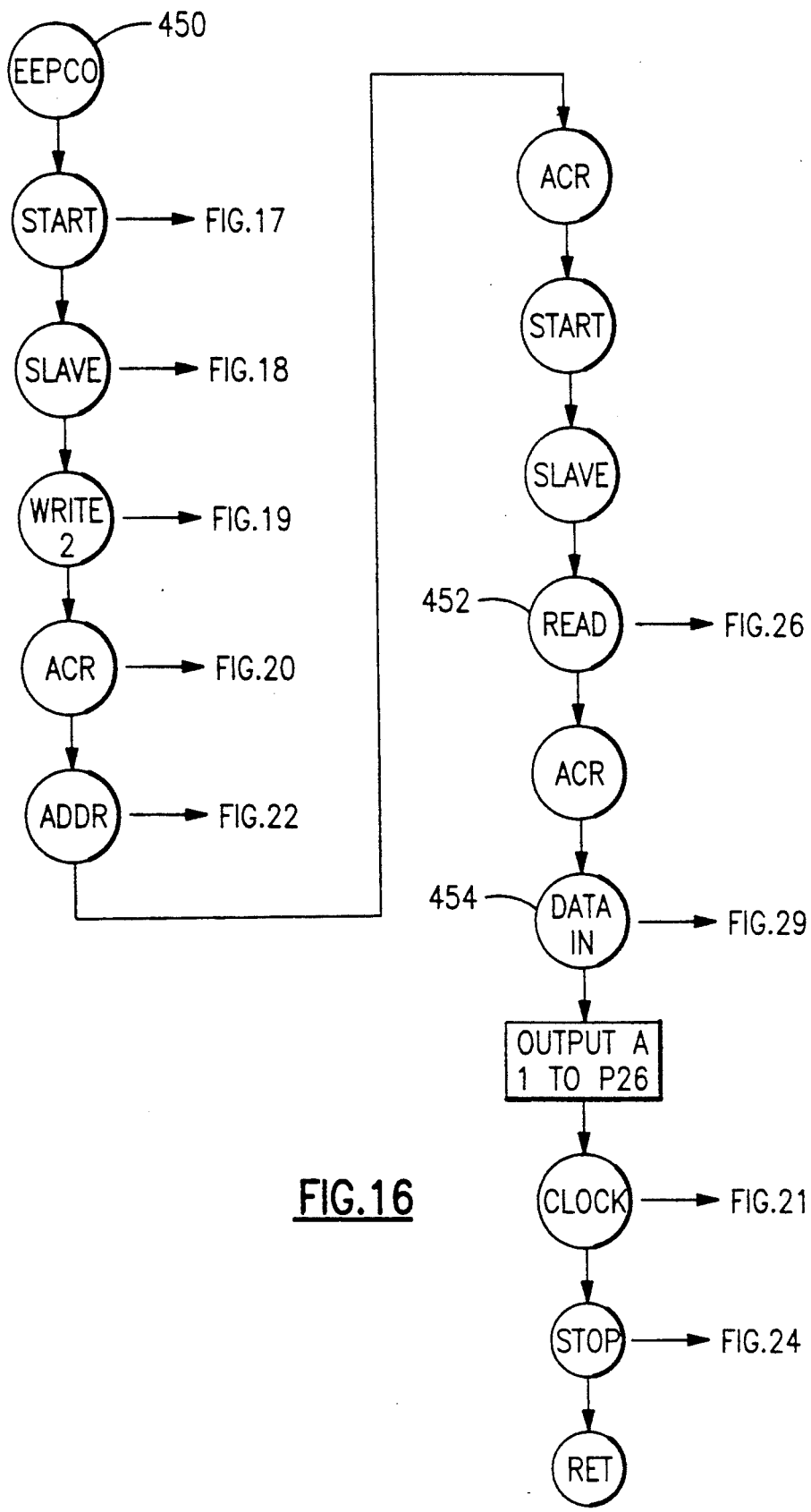

A subroutine EEPRD, as indicated in a step 130 in FIG. 6, and as shown in detail in FIG. 16, is executed next. EEPRD reads the EEPROM and returns the floor location in R1. The diagram of the EEPRD routine of FIG. 16 is very similar to the interrupt routine shown in FIG. 15. Before the EEPROM can be read, a "dummy write" must be issued. Referring now to FIG. 16, it will be seen that START, SLAVE, WRITE2, ACK subroutines 348, 350, 352, 354 are shown, respectively, in FIGS. 17, 18, 19, and 20. After the first execution of the start routine, the slave address routine 350 of FIG. 18 is executed, the WRITE2 routine 352 of FIG. 19 and the acknowledge routine 354 of FIG. 20 are executed, and the EEPROM transmits eight bits as shown in the address routine 400 of FIG. 22.

The second repetition of the start routine 348 of FIG. 16 begins the read routine. After routines ACK, START, and SLAVE are run a second time, a READ routine 452 is executed as shown in FIG. 26. The ACK data gathered in the next subroutine is read and stored in R1 during the DATIN 454 routine of FIG. 29. Then the data line is held high, and an extra clock pulse is given to simulate an acknowledge from the controller. The clock and stop routines then execute, after which communication between the EEPROM and the microcontroller ends.

Referring back to FIG. 6, if a decision step 132 determines the contents of R1 are all 1's, this means the EEPROM is not in its socket, and a jump to initialization subroutine 122 is issued. This might occur during initial adjustment where the power is turned on and off so often that the serviceman is instructed to remove the EEPROM until turnover to the customer. If the EEPROM is in its socket, a step 134 is executed in which the EEPROM floor location is put into the landing register; and a subroutine MAINJ, as indicated in a call step 136, is executed, which merely represents the steps 110, 112, 114, already described.

Thus, a system with the EEPROM installed will automatically enter the main program. There are two methods of entering initialization. If the EEPROM is removed from its socket or the TCR DIP switch is set to five zeros before power is turned on, initialization will be entered.

Figure 10B:
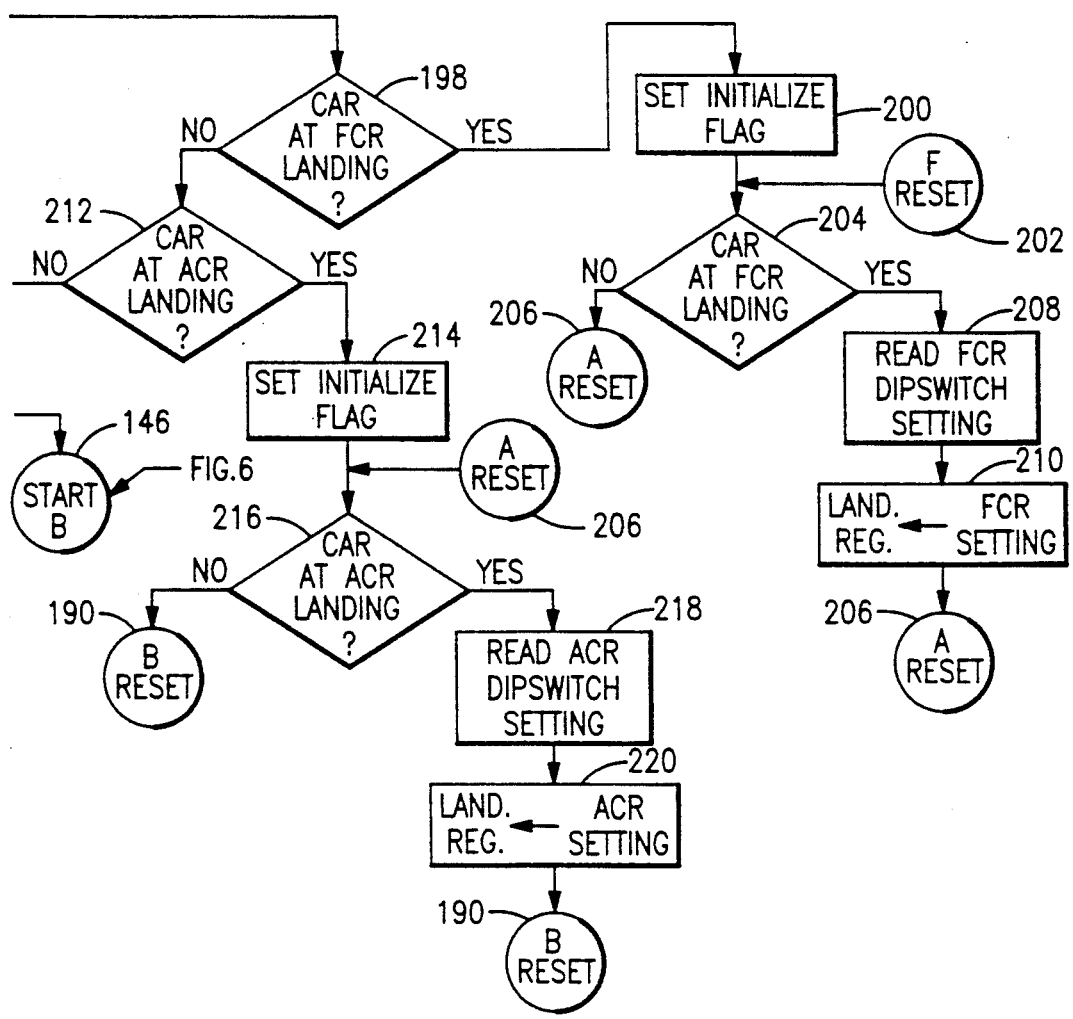

Once initialization is entered, it remains in this part of the program until a correction (TCR, BCR, FCR or ACR inputs) is given. The initialization routines are shown in FIGS. 9 and 10. In FIG. 9, the momentary buttons and corresponding DIP switches are read and displayed. In FIG. 10, the input ports on the signal processor 12a are read to look for a correction pulse. While in initialization, pushing the momentary switches (buttons) causes the TCR, FCR, or ACR DIP switch settings to be displayed on the display 48, 50 of FIG. 4. To accomplish this, as shown in FIG. 6, a series of steps 138, 140, 142 are used to clear the landing register and I/O ports. A step 144 assumes the car is at the first floor and outputs a 1 to the display decoder and landing register. A START B subroutine 146 is next executed in which the DOG subroutine 102 is executed to output a pulse to the watchdog and a step 148 is executed to read the momentary switches. A transfer is next made to a subroutine A 150 as shown in more detail in FIG. 9 to read the DIP switches and the momentary buttons, as pushed and set by the serviceman.

Turning now to FIG. 9, a decision step 152 is executed to determine if the TCR button 58 is being pressed. If so, the TCR DIP switch 52 is read, as indicated in a step 154. If the TCR setting is equal to zero, as indicated by a yes answer in a decision step 156, then the zero TCR setting is output to the display 48, 50 as indicated in a step 158. If not, the TCR setting is converted to BCD code, as indicated in a step 160, before being output on the display. In either event, a CORREC subroutine is next executed, as indicated in a step 162 and as more fully disclosed subsequently in connection with FIG. 10.

If it is determined in the step 152 that the TCR button is not pressed, a determination is made in a step 164 as to whether or not the ACR button 60 is pressed. If so, the ACR DIP switch 54 is read as indicated in a step 166 and a determination is made in a step 168 as to whether or not the ACR setting is equal to zero. If not, a conversion of the non-zero setting to BCD is made in a step 170, and if so, the ACR setting is output directly to the display, as indicated in a step 172 before executing the CORREC subroutine 162 of FIG. 10.

If it is determined in step 164 that the ACR button is not pressed, a decision step 174 is executed, in which a determination is made as to whether or not the FCR button 62 is pressed. If not, the CORREC subroutine 162 of FIG. 10 is executed directly. If so, the FCR DIP switch 56 is read, as indicated in a step 176, and a determination is made in a step 178 as to whether or not the FCR setting is equal to zero. If not, it is converted to BCD before being displayed, as indicated in a step 180.

Turning now to FIG. 10, the CORREC 162 is there illustrated. First, the microcontroller port 1 inputs are read as indicated in a step 184, and a decision step 186 then determines whether or not a BCR input pulse is present, i.e., whether the car is approaching the BCR landing. If the car is approaching the bottom landing, the initialize flag is set in a step 188 by putting the selected hex number (5A) in the selected location (62) for storage therein, and then a subroutine BRESET 190 is commenced. If the car is approaching the bottom landing (1), as again determined in a decision step 192, a "1" is output to the display 48, 50 and to the landing register for storage therein, as indicated in a step 194 before making a transition to a MAIN subroutine 196, as disclosed in more detail in FIG. 11. If it is determined in step 192 that the car is not approaching the bottom landing, the MAIN subroutine is executed directly.

If it is determined in step 186 that the car is not approaching (or "at") the bottom landing, a step 198 is executed to determine if the car is approaching the FCR landing. If so, the initialize flag is set, as indicated in a step 200, and a FRESET subroutine 202 is next executed. Since the FRESET subroutine may be entered from other parts of the program, as shown below in this FIG. 10, the step 198 is repeated in a step 204 to make a determination as to whether or not the car is at the FCR landing. If not, a subroutine ARESET 206 is executed (see identical call subroutine immediately below circle 206 in FIG. 10). If so, a step 208 is executed in which the FCR DIP switch 56 is read and its contents stored in the landing register, as indicated in a step 210 before making a transition to the ARESET subroutine 206. If it is determined in step 198 that the car is not at the FCR landing, a step 212 is executed to determine whether or not the car is approaching the ACR landing. If the elevator is at the alternate firemen's landing, the initialize flag is set in a step 214 and a determination is made again in a step 216 as to whether or not the car is approaching the ACR landing. This determination is made again because transitions to this part of the program can be made from elsewhere. If not, the BRESET subroutine 190, shown elsewhere on this diagram, is executed directly. If so, a step 218 is executed in order to determine the ACR DIP switch setting, and a step 220 stores that setting in the landing register before executing the BRESET subroutine 190.

If it is determined in step 212 that the elevator is not at the ACR landing, a step 222 is executed in which a determination is made as to whether or not the car is approaching the TCR landing. If not, the STARTB subroutine 146 of FIG. 6 is executed. If so, the initialize flag is set in a step 224 and a TRESET subroutine 226 is next executed by making a determination in a step 228 as to whether or not the car is approaching the TCR landing. If not, the FRESET subroutine 202 is executed directly. If so, the TCR DIP switch 52 is first read in a step 230 and stored in the landing register as indicated in a step 232.

If the elevator is not approaching any of these four landings as indicated in step 146, then we jump back to FIG. 6, as indicated, to execute the STARTB subroutine 146. This forces the serviceman to set the DIP switches before anything else can happen.

Figure 11:
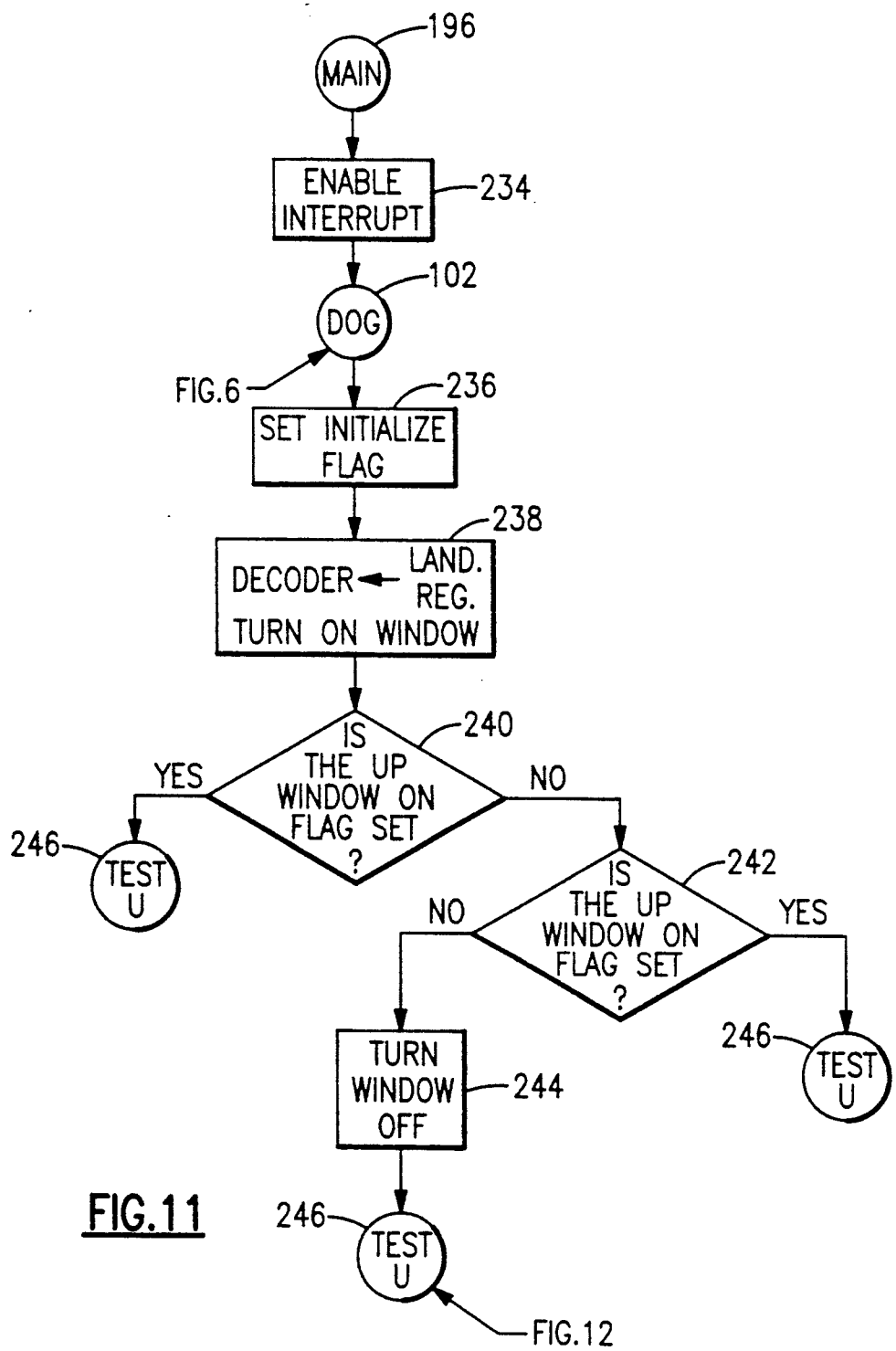

Now turning to the heart of the program, as shown in FIG. 11, the MAIN subroutine 196 is shown in detail. It is responsible for stepping up and down in response to the UP and DN inputs. Flags are used to ensure it will only count once each time the reader box is on an UP or DN vane. It is also responsible for activating the window relay while the reader box is on one of the vanes. There are short periods of time when the window is turned on or off when it should not be. However, the amount of time involved is not long enough for the relay to respond.

As a first step, we enable the interrupt line. If a power failure is detected, control will be immediately transferred to the interrupt routine to be described in FIG. 15. We then execute the DOG subroutine 102 of FIG. 6 in order to output a pulse to the watchdog circuit 64 before setting the initialize flag in a step 236. This flag is used to distinguish between a power up and a reset. The contents of the landing register (location 32) are then output to the decoder 42 and, at the same time, we turn on the window at P27, as indicated in a step 238. A determination is then made in a step 240 as to whether or not the UP WINDOW ON flag is set or not. If not, a step 242 determines if the DN WINDOW ON flag is set or not. If not, the window is turned off, as indicated in a step 244 before executing a TESTU subroutine 246, as shown in more detail in FIG. 12. If either step 240 or 242 gives an affirmative result, the TESTU subroutine 246 is executed directly. Thus, if the window should be on because the reader box is currently on an UP vane, R7 would contain 5A (HEX). If the window should be on because the reader box is currently on a down vane, register R5 would contain 5A (HEX). If either register contains 5A (HEX), i.e., answers to steps 240 or 242, we jump directly to TESTU. Otherwise, we turn the window off.

Figure 12:
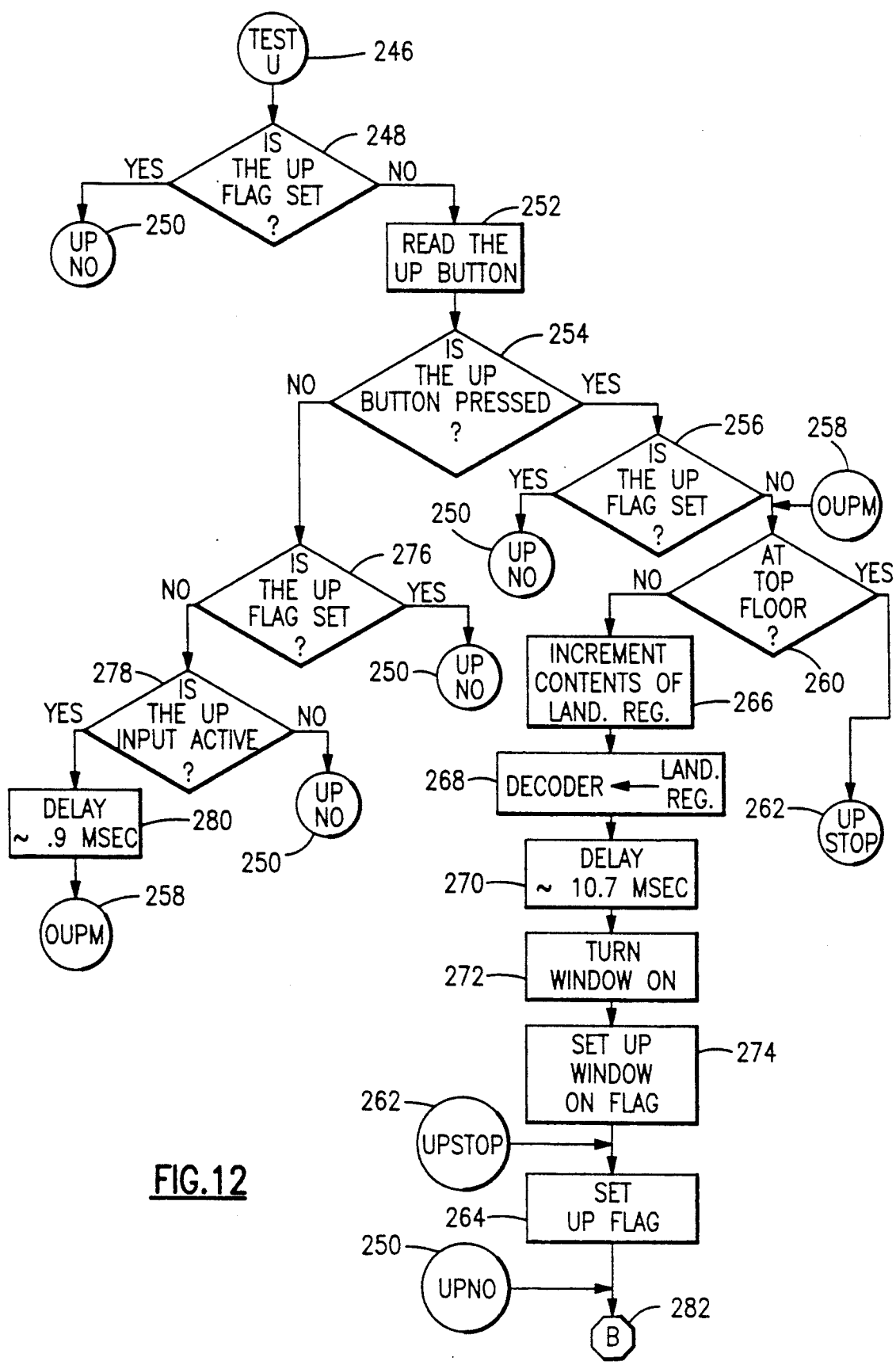

Turning now to FIG. 12, the TESTU subroutine 246 is there shown in detail. First, the UP flag is tested to see if it is set or not (step 248). If so, the stepper has already been incremented and we jump directly to a subroutine UPNO 250, which is shown in more detail in FIG. 13. If the step 248 determines that the UP flag is not set, the UP button 62 is read, as indicated in a step 252, before determining in a step 254 whether or not the UP button is pressed or not. If so, a step 256 is executed to determine if the UP flag is set or not. If so, the UPNO subroutine 250 is executed. If not, a subroutine OUPM 258 is executed in which the TCR DIP switch 52 is read to see if the car is at the top floor, as determined in a step 260. If so, a subroutine, UPSTOP is executed in which the UP flag is set, as indicated in a step 264. If step 260 determines that the car is not at the top floor, then a step 266 is executed to increment the contents of the landing register and output the result to the decoder as shown in step 268. After a delay of approximately 10 milliseconds, we turn on the window as indicated in a step 272 and set up the WINDOW ON flag, as indicated in a step 274. This is a software tuned window which will remain on for approximately one quarter second after the vane is first encountered.

If it is determined in step 254 that the UP button 62 is not pressed, a determination is made in a step 276 as to whether or not the UP flag is set. If so, the UPNO subroutine 250 is executed directly. If not, a determination is next made in a step 278 as to whether or not the UP input is active. If not, UPNO 250 is executed. If so, a delay of approximately 0.9 milliseconds is inserted, as indicated in a step 280, and the subroutine OUPM 258 is next executed in order to determine if the car is at the top floor or not.

Figure 13:
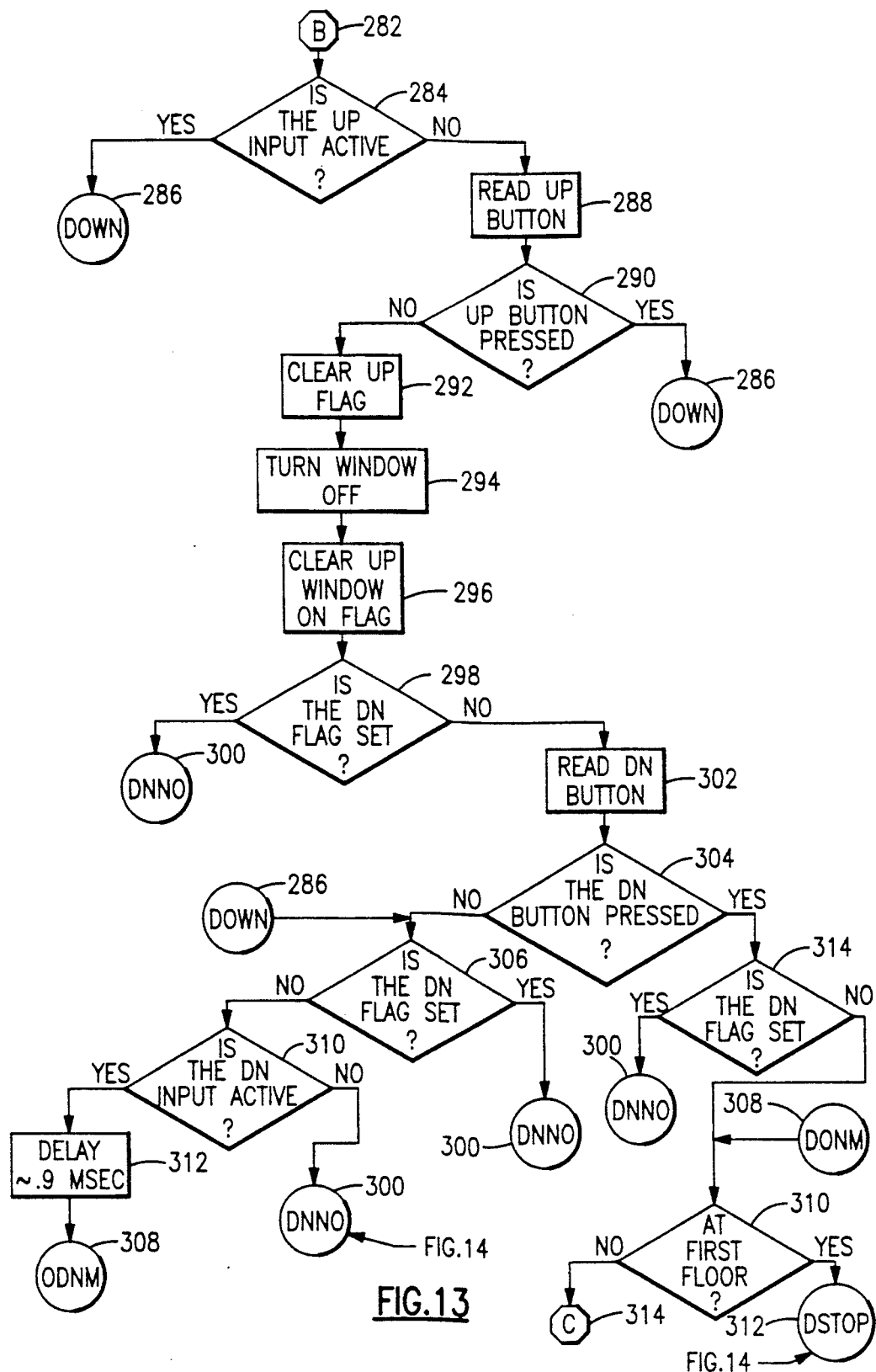

Turning now to FIG. 13, a determination is again made in a step 284 as to whether or not the UP input is active. If so, a DOWN subroutine 286, shown below in this FIG. 13, is executed. If not, the UP button 62 is read in a step 288 and a determination in a step 290 as to whether or not the UP button 62 is pressed. If so, the DOWN subroutine 286 is executed. If not, the UP flag is cleared, as indicated in a step 292, the window is turned off, as indicated in a step 294, and the UP WINDOW ON flag is cleared, as indicated in a step 296. If the DN flag is set, as indicated in a step 298, the stepper has already been decremented, so we jump to a DNNO subroutine 300 which is executed, as described more fully in connection with FIG. 14, which is similar to FIG. 13 except for DN. If the determination of step 298 is negative, the DN button 58 is read, as indicated in a step 302 before determining in a step 304 whether or not the DN button 58 is pressed. If the DN button is not pressed, we execute a decision step 306 to determine if the DN flag is set. If so, we execute the subroutine DNNO 300 of FIG. 14. If it is not, we determine if the DN input is active, as determined in a step 310. If so, after a short delay of approximately 0.9 milliseconds, as shown in a step 312, we execute an ODNM subroutine 308, as shown in this FIG. 13. If not, we execute the DNNO subroutine 300.

If it is determined in step 304 that the DN button is pressed, a step 314 is executed to find out if the DN flag is set or not. If so, the DNNO subroutine 300 is executed. If not, the ODNM subroutine 308 is executed instead. In that subroutine, a step 310 determines whether or not the landing register contains the number 1. If it does, we go to a subroutine DSTOP 312 for setting the DN flag (F1), as shown in FIG. 14.

Figure 14:
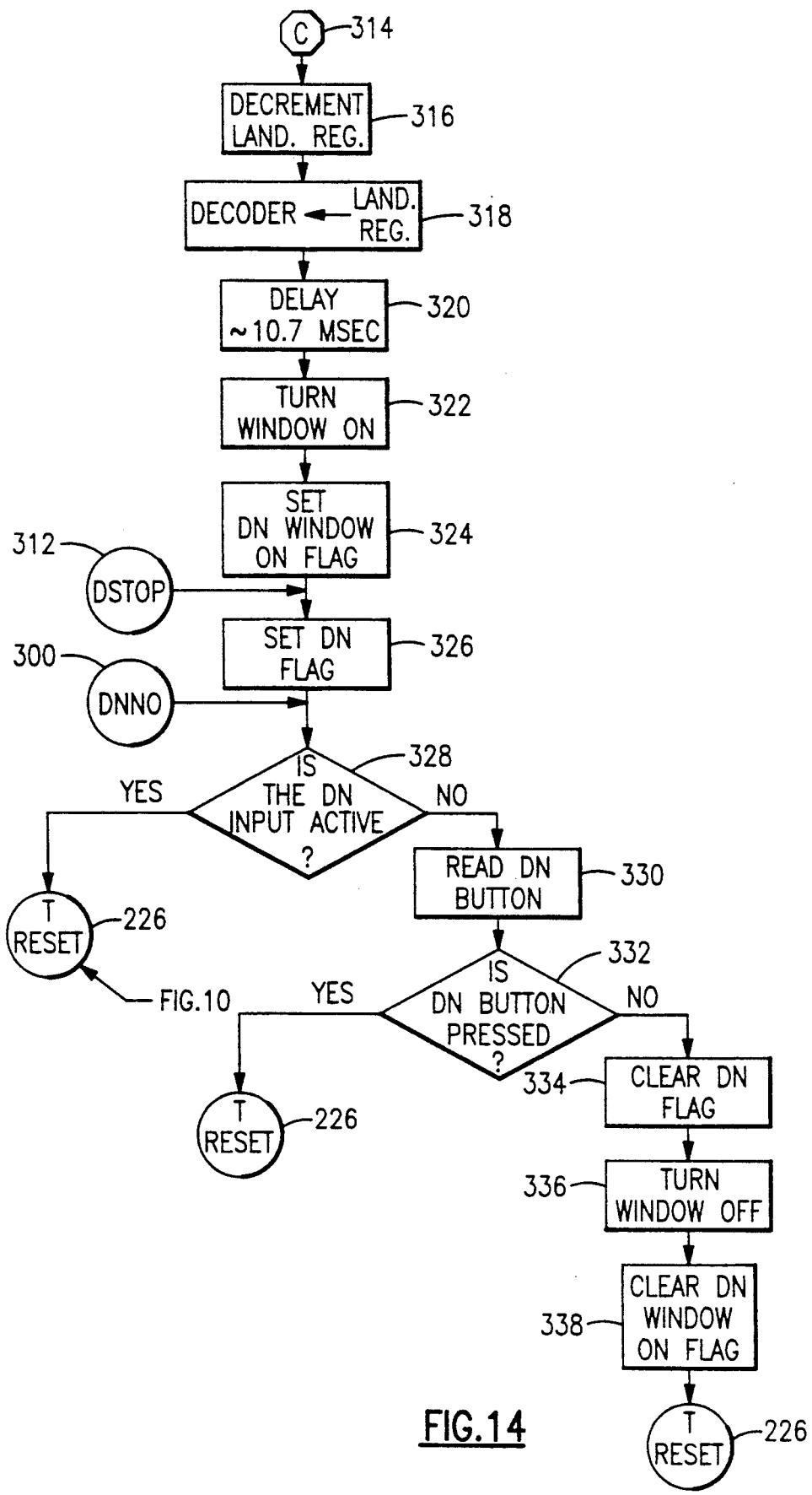

Turning now to FIG. 14, we decrement the contents of the landing register in a step 316 and load the contents of the landing register, as decremented, into the decoder 42 as indicated in a step 318. After approximately ten milliseconds, as indicated in a step 320, we turn on the window, as indicated in a step 322, and set the DN WINDOW ON flag, as indicated in a step 324. We then execute the subroutine DSTOP 312 by setting the DN flag, as indicated in a step 326. We then executed DNNO subroutine 300 by first determining in a step 328 whether or not the DN input is active. If so, we execute the subroutine TRESET 226, as shown in FIG. 10. If not, the DN button 58 is read, as indicated in a step 330 in order to determine, as indicated in a step 332, whether or not the DN button is pressed. If so, the TRESET subroutine 226 is executed directly. If not, the DN flag is cleared, the window is turned off, and the DN WINDOW ON flag is cleared, as indicated in steps 334, 336, and 338, after which the subroutine TRESET 226 is executed.

Turning now to FIG. 15, we show the interrupt (INTRPT) subroutine 340 (INTRPT) for writing the contents of the landing register to the EEPROM. The data line P25 is used to serially transmit bits of information which are clocked by the clock line P26. The interrupt routine is very similar to the EEPRD routine which reads the EEPROM and has already been described in connection with FIG. 16.

If a brown-out occurred, the interrupt line would be held low and the controller would be continually writing to the EEPROM. To prevent this from happening, a counter is used to make sure that the EEPROM is written to a maximum of two times. This counter is located at location 61. In the beginning of the program, the number 2 is put in location 61 (as described in connection with the WAKE subroutine of FIG. 8). A description of the interrupt routine 340 follows.

First, a step 342 determines whether or not the interrupt line is low. This is checked ten times at intervals of 0.5 milliseconds. This is to prevent noise from causing an interrupt and using up one of the two allowed writes to the EEPROM. If the interrupt line is not found to be low during any of these checks, an OUTINT subroutine 344 is executed, which is shown in FIG. 15 as disabling the interrupt. If the interrupt line is found to be low ten times, a step 346 is executed to determine the contents of location 61. If the contents are zero, we jump to the OUTINT subroutine 344. If not zero, the controller begins communicating with the EEPROM by executing a START subroutine 348, a SLAVE subroutine 350, and a WRITE2 subroutine 352. The EEPROM acknowledges that it received the information by pulling the data line low in an ACK subroutine 354. The START subroutine 348 of FIG. 17 sets the data (P25) and clock (P26) high, as indicated in a step 356, sets the data (P25) low, as indicated in a step 358, and sets the clock (P26) low, as indicated in a step 360 before returning in a step 362 to execute the SLAVE routine 350.

The SLAVE routine of FIG. 18 puts the number 7 in register 0, as indicated in a step 364 and puts a slave address (1010001) in the accumulator, as indicated in a step 366. The location is then output to P25, as indicated in a step 368, and a subroutine CLOCK 370 is next executed, as shown in FIG. 21.

A step 372 is next executed to rotate the accumulator left, followed by decrementing the zero register in a step 374, after which a determination in a step 376 as to whether or not the zero register is equal to zero. If not, the steps 368, 370, 372, 374, 376 are re-executed until it is equal to zero, at which point a return is made in a step 378 to the routine of FIG. 15 wherein the next subroutine to be executed is the WRITE2 subroutine 352.

Referring now to FIG. 19, the WRITE2 subroutine 352 is illustrated in which a 0 is output at P25 as data in a step 380 and a return is made in a step 382 to the routine of FIG. 15 wherein the ACK subroutine 354 is executed, as further illustrated in FIG. 20, in which the data line P25 is set high, as indicated in a step 384, the CLOCK subroutine 370 is executed as illustrated in FIG. 21, and a return is made in a step 388 to the routine of FIG. 15.

Figure 22:
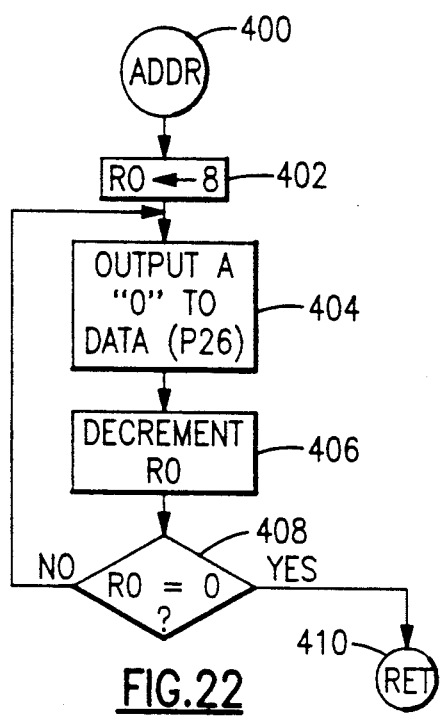

Returning now to FIG. 21, the CLOCK subroutine 370 is there shown. In a step 390, the clock line P26 is set high before delaying for approximately 5 microseconds and setting the clock low, as indicated in steps 392, 394. A return is then made in a step 396 to executed the next subroutine of FIG. 15 which is an ADDR subroutine 400 as shown in more detail in FIG. 22. In the routine of FIG. 22, the address 00000000 is specified as the EEPROM location which will store the contents of the landing register. The EEPROM again responds with an acknowledge. As shown in FIG. 22, a step 402 loads the number 8 into the 0 register, and a 0 is then output to data (P25), as indicated in a step 404, before decrementing the 0 register in a step 406. A decision step 408 decides whether or not the zero register equals zero. If not, steps 404, 406, 408 are re-executed until it does equal zero. Once it equals zero, a return is made in a step 410 to the routine of FIG. 15 in order to execute the ACK subroutine 354 again in a step 354a. Once this is done, a DATAOT subroutine 412 is executed, as shown in more detail in FIG. 23.

Figure 23:
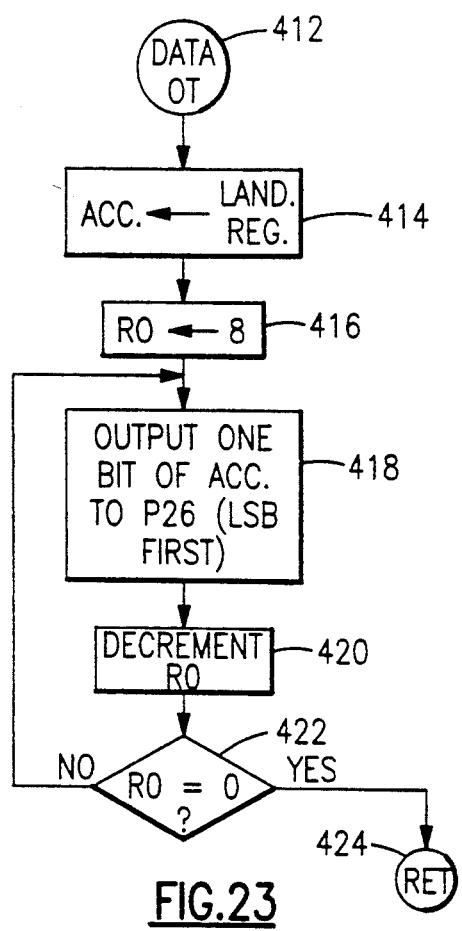

The DATAOT subroutine 412 transmits the eight bits in the landing register to the EEPROM. The EEPROM then acknowledges that it received the data. Referring to FIG. 23, the contents of the landing register are stored in the accumulator, as indicated in a step 414, and the number 8 is stored in the zero register, as indicated in a step 416. One bit of the accumulator is then output to P25 (LSB first), as indicated in a step 418. The zero register is then decremented as indicated in a step 420, and a determination is made in a step 422 as to whether or not the register has been fully decremented. If not, steps 418, 420, 422 are repeated until it is and then a return is made in a step 424.

Figure 24:
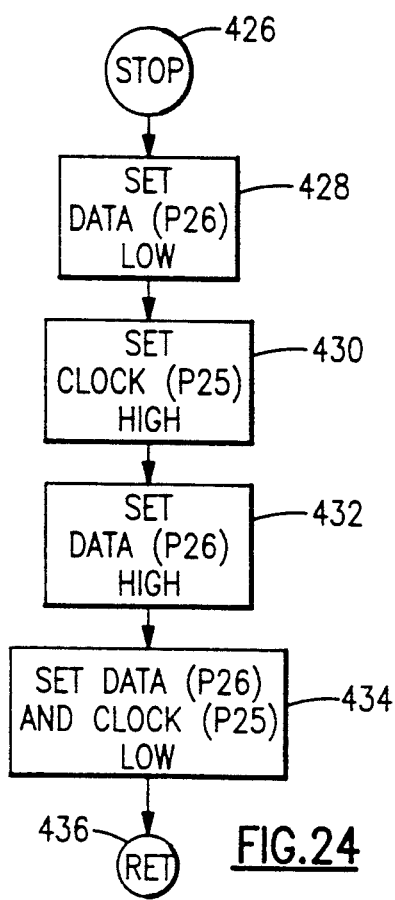
Figure 25:
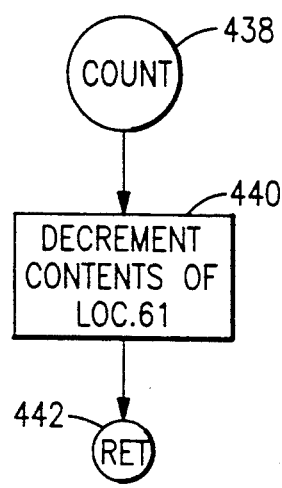

Returning to FIG. 15, an ACK subroutine 354b is repeated again, as shown in FIG. 20, and then a STOP subroutine 426 is executed as indicated in more detail in FIG. 24. In this subroutine, a STOP condition is issued by setting the data (P25) low, as indicated in a step 428, setting clock (P26) high, as indicated in a step 430, setting data (P25) high again, as indicated in a step 432 and finally setting data (P25) and clock (P26) low, as indicated in a step 434 and returning in a step 436 to execute a COUNT subroutine 438, as shown in more detail in FIG. 25, which has the purpose of counting the number of times the interrupt routine has been completed by decrementing location 61, as shown in a step 440. A return is then made in a step 442 to execute the OUTINT subroutine 344, as shown in FIG. 15, which disables the interrupt line, as indicated in a step 444, and makes a return as indicated in a step 446.

Turning again now to FIG. 16, the EEPRD subroutine 450 is shown in detail. All of the subroutines shown seriatim in FIG. 16 have already been described in connection with FIG. 15 and will not be described in great detail in order to avoid duplicative text. The only new routines appearing in FIG. 16, not previously disclosed, are subroutines 452, 454, 456, and 458, as disclosed in detail in FIGS. 26, 29, 27, 28, respectively.

The READ subroutine 452 includes a step 460 which outputs a "1" to data (P25) before returning in a step 462.

FIG. 29 starts with loading a "0" into the R1 register, as indicated in a steps 456a, and loading a number 8 into the zero register, as indicated in a step 458a. A "1" is then output to data (P25), as indicated in a step 460a. A CLKHI subroutine 456 is next executed, as shown in detail in FIG. 27 whereby the clock (P26) is set high in a step 456b before returning to execute a step 480 in which port 2 is read before executing a CLKLO subroutine 458 as shown in detail in FIG. 28. There, the clock (P26) is set low, as indicated in a step 482, before returning in a step 484 to execute a step 486 in which P25 is loaded into the MSB of R1. R1 is then rotated right, as indicated in a step 488, before decrementing R0 in a step 490. A determination is then made in a step 492 as to whether or not R0 equals 0. If not, steps 460a, 456a, 480, 458, 486, 488, 490, 492 are re-executed until it does equal zero. When it equals zero, a return is made in a step 494.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Elevator car floor position indicating means, responsive to a hoistway input signal indicative of said car passing a floor in an up and down direction, for providing, respectively, an increment and decrementing output signal indicative of the floor position of said car, comprising:

an initialization switch, being settable to be indicative of a selected reference position of said car, responsive to an interrogating signal, for providing a reference signal indicative of said reference position as set by said settable initialization switch; and signal processing means, responsive to:

said hoistway input signal, for providing said incrementing and decrementing output signal;

a request for initialization signal, for providing said interrogating signal; and both a correction signal indicative of the position of said car being at said reference position and said reference signal, for providing said output signal with a referenced magnitude indicative of the same floor as that indicated by the magnitude of said reference signal and for thereafter incrementing and decrementing said output signal starting from said referenced magnitude;

wherein said signal processing means provides a display signal having a magnitude indicative of the magnitude of said output signal and wherein said indicating means further comprises display means, responsive to said display signal, for displaying said magnitude of said display signal, said indicating means further comprising toggle switch means, responsive to manual toggling, for providing a toggle signal to said signal processing means for incrementing or decrementing said magnitude of both said output signal and said display signal.

2. Elevator car floor position indicating means, responsive to a hoistway input signal indicative of said car passing a floor in an up and down direction, for providing, respectively, an incrementing and decrementing output signal indicative of the floor position of said car, comprising:

an initialization switch, being settable to be indicative of a selected reference position of said car, responsive to an interrogating signal, for providing a reference signal indicative of said reference position as set by said settable initialization switch; and signal processing means, responsive to:

said hoistway input signal, for providing said incrementing and decrementing output signal;

a request for initialization signal, for providing said interrogating signal; and both a correction signal indicative of the position of said car being at said reference position and said reference signal, for providing said output signal with a referenced magnitude indicative of the same floor as that indicated by the magnitude of said reference signal and for thereafter incrementing and decrementing said output signal starting from said referenced magnitude; said indicating means further comprising toggle switch means, responsive to manual toggling, for providing a toggle signal indicative of a request for display of said selected reference position and wherein said signal processing means is responsive thereto for providing a display signal having a magnitude indicative of said magnitude of said reference signal; and display means, responsive to said display signal, for displaying said magnitude of said display signal.

3. Elevator car floor position indicating means, responsive to a hoistway input signal indicative of said car passing a floor in up and down directions, for providing, respectively, an incrementing and decrementing output signal indicative of the floor position of said car, comprising:

signal processing means, responsive to said hoistway input signal, for providing said incrementing and decrementing output signal and for providing a window signal after a selected delay for so long as said input signal persists, said window signal being indicative of an end of time interval during which a stopping sequence of said car must be initiated in order to stop at an approaching floor; and a relay, responsive to said window signal, for providing a contact closure.

4. The indicating means of claim 3, further comprising display means, responsive to said window signal, for indicating the presence thereof.

* * * * *